(12) United States Patent
Bhatia et al.

(10) Patent No.: US 11,329,747 B2
(45) Date of Patent: May 10, 2022

(54) SCHEDULING DETERMINISTIC FLOWS IN TIME SYNCHRONIZED NETWORKS

(71) Applicant: Nokia Solutions and Networks Oy, Espoo (FI)

(72) Inventors: Randeep Bhatia, Green Brook, NJ (US); Tirunell V. Lakshman, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/925,635

(22) Filed: Jul. 10, 2020

(65) Prior Publication Data
US 2022/0014297 A1 Jan. 13, 2022

(51) Int. Cl.
*H04J 14/02* (2006.01)
*H04J 3/16* (2006.01)
*H04J 3/06* (2006.01)

(52) U.S. Cl.
CPC .............. *H04J 3/16* (2013.01); *H04J 3/0635* (2013.01)

(58) Field of Classification Search
CPC .............. H04J 14/0271; H04J 14/0257; H04J 14/0212; H04L 5/0035; H04L 5/0055; H04L 5/0057; H04L 12/2869; H04L 12/5695; H04L 47/00; H04L 47/70; H04L 47/78; H04L 47/821; H04L 47/827; H04W 72/04
See application file for complete search history.

(56) References Cited

U.S. PATENT DOCUMENTS

| | | | |
|---|---|---|---|
| 2004/0170198 A1* | 9/2004 | Meggers | H04N 21/64738 370/514 |
| 2006/0182118 A1* | 8/2006 | Lam | H04L 47/13 370/395.42 |
| 2008/0112439 A1 | 5/2008 | Vestal | |
| 2008/0186989 A1 | 8/2008 | Kim | |
| 2009/0252124 A1 | 10/2009 | Yeo et al. | |
| 2010/0061235 A1* | 3/2010 | Pai | H04L 47/10 370/230.1 |
| 2012/0163173 A1* | 6/2012 | Satapathy | H04L 47/25 370/232 |

(Continued)

OTHER PUBLICATIONS

IEEE, "IEEE Standard for Local and Metropolitan Area Networks, Bridges and Bridged Networks, Amendment 25: Enhancements for Scheduled Traffic," IEEE Standard 802.1Qbv, 2015, 57 pages.

(Continued)

*Primary Examiner* — Jung Liu
(74) *Attorney, Agent, or Firm* — Tong, Rea, Bentley & Kim, LLC

(57) ABSTRACT

Various example embodiments for supporting scheduling of deterministic flows in time synchronized networks are presented. Various example embodiments for supporting scheduling of deterministic flows in a time synchronized network may be configured to support scheduling of deterministic flows in the time synchronized network based on assignment of transmission start times to data flows of communication devices such that the communication devices may transmit data of the data flows at the transmission start times in a manner tending to reduce or eliminate collisions in the time synchronized network.

20 Claims, 7 Drawing Sheets

(56) References Cited

U.S. PATENT DOCUMENTS

| | | | | |
|---|---|---|---|---|
| 2015/0016266 A1* | 1/2015 | Dumitrescu | .......... | H04L 47/215 |
| | | | | 370/236 |
| 2016/0197834 A1* | 7/2016 | Luft | ...................... | H04L 67/327 |
| | | | | 709/223 |
| 2018/0084559 A1* | 3/2018 | Kim | .................... | H04W 72/042 |
| 2018/0317213 A1* | 11/2018 | Islam | .................... | H04L 1/1864 |
| 2018/0338318 A1* | 11/2018 | Yum | ................. | H04W 72/1205 |
| 2018/0367236 A1* | 12/2018 | Zhang | ................. | H04J 14/0257 |
| 2021/0119930 A1* | 4/2021 | Debbage | ............... | H04L 47/125 |

OTHER PUBLICATIONS

Kim, B.C., et al., "Zero Latency Queuing Systems Based on Deficit Round Robin", 2007 IEEE 16th International Conference on Computer Communications and Networks, Honolulu, HI, pp. 334-339, Aug. 13, 2007.

Falk, J., et al., "Exploring Practical Limitations of Joint Routing and Scheduling for TSN with ILP," 2018 IEEE 24$^{th}$ International Conference on Embedded and Real-Time Computing Systems and Applications (RTCSA), Hakodate, Japan, pp. 136-146, Aug. 28, 2018.

Tovar, E., et al., "Real-Time Fieldbus Communications using Profibus Networks," IEEE Transactions on Industrial Electronics, vol. 46, No. 6, 1241-1251 pages, Dec. 1999.

Ying, K.C., et al., "Improved Exact Methods for Solving No-Wait Flowshop Scheduling Problems With Due Date Constraints," IEEE Access, vol. 6, pp. 30702-30713, May 10, 2018.

Dürr, F. et al., "No-wait Packet Scheduling for IEEE Time-sensitive Networks (TSN)," Proceedings of 24$^{th}$ International Conference on Real-Time Networks and Systems, pp. 1-10, Oct. 2016.

\* cited by examiner

FIG. 2

RANDOMIZED ALGORITHM
PSEUDOCODE
200

1: for $i \leftarrow 1$ to $N$ do
2:     $A_i \leftarrow \{s(f) \leftarrow$ random slot from $C(f), \forall f\}$
3: end for
4: $A \leftarrow \text{Best}\{A_1, A_2, \ldots A_N\}$
5: return $A$

FIG. 3

GREEDY ALGORITHM
PSEUDOCODE
300

1: $F_0 = \emptyset$
2: for $i \leftarrow 1$ to $|F|$ do
3:     $R_i \leftarrow \{s \in C(f_i) | \exists g \in F_{i-1}, f_i$ collides with flow $g$ when it is started at time slot $s\}$
4:
5:     if $C(f_i) \setminus R_i = \emptyset$ then
6:         return $\emptyset$
7:
8:     else
9:         $s(f_i) \leftarrow$ any random time slot in $C(f_i) \setminus R_i$
10:
11:     end if
12:     $F_i \leftarrow F_{i-1} \cup \{f_i\}$
13: end for
14: $A \leftarrow$ slot assignments $s(f_1), s(f_2), \ldots$
15: return $A$

FIG. 4

RANDOM-GREEDY
ALGORITHM
PSEUDOCODE
400

1: $G_1, G_2, \ldots G_S = \emptyset$
2: for $i \leftarrow 1$ to $|F|$ do
3:     $j \leftarrow$ random value between 1 and $S$
4:     $G_j \leftarrow f_i$
5: end for
6: return $G_1, G_2, \ldots G_S$

FIG. 5

LOCAL-GREEDY
ALGORITHM
PSEUDOCODE
500

1: $P_0 = G_1, G_2, \ldots G_S$, an arbitrary partition
2: $j \leftarrow 0$
3:
4: while True do
5:
6:     if In $P_j$ all nodes have load $< 1$ then
7:         return $P_j = G_1, G_2, \ldots G_S$
8:
9:     end if
10:     $p = \{i, k\} \leftarrow N(P_j)$
11:
12:     if $p \neq \emptyset$ then
13:         In partition $P_{j+1}$, $G_{M(P,i)} \leftarrow G_{M(P,i)} - \{i\}$
14:         In partition $P_{j+1}$, $G_k \leftarrow G_k \cup \{i\}$
15:
16:     else
17:         return $P_j = G_1, G_2, \ldots G_S$
18:
19:     end if
20:     $j \leftarrow j+1$
21:
22: end while

CONTENTION ALGORITHM
PSEUDOCODE
600

1: for $k \leftarrow 1$ to $|F|$ do
2:    for $l \leftarrow k+1$ to $|F|$ do
3:       if Equation (2) holds for flows $f_k$ and $f_l$ then
4:          return FALSE
5:       end if
6:    end for
7: end for
8: return TRUE

NETWORK
700

SCHEDULING DETERMINISTIC FLOWS IN TIME SYNCHRONIZED NETWORKS

TECHNICAL FIELD

Various example embodiments relate generally to communication networks and, more specifically but not exclusively, to supporting scheduling of deterministic flows in various types of time synchronized networks.

BACKGROUND

In many communication networks, various communications technologies may be used to support communication of information in communication flows.

SUMMARY

In at least some example embodiments, an apparatus includes at least one processor and at least one memory including a set of instructions, wherein the set of instructions is configured to, when executed by the at least one processor, cause the apparatus to receive, by a controller of a time synchronized network from a set of end hosts of the time synchronized network, a set of requests by the end hosts to transmit data of a set of data flows on the time synchronized network, determine, by the controller based on a process, a start time assignment indicative of a set of start times at which the end hosts are to begin transmission of the respective data flows on the time synchronized network, and send, by the controller toward the set of end hosts, the start times at which the end hosts are to begin transmission of the respective data flows on the time synchronized network. In at least some example embodiments, for at least one of the start times at which the end hosts are to begin transmission of the respective data flows on the time synchronized network, the start time includes a respective time slot selected from a set of available time slots associated with a time interval for the respective data flow. In at least some example embodiments, to determine the start time assignment, the set of instructions is configured to, when executed by the at least one processor, cause the apparatus to determine, by the controller, a set of potential start time assignments, wherein each of the potential start time assignments includes a respective set of start times at which the end hosts are to begin transmission of the respective data flows on the time synchronized network and select, by the controller, one of the potential start time assignments as the start time assignment indicative of the set of start times at which the end hosts are to begin transmission of the respective data flows on the time synchronized network. In at least some example embodiments, for at least one of the potential start time assignments, the respective potential start time assignment is determined based on random selection from a set of available time slots associated with a time interval for the respective data flow. In at least some example embodiments, the one of the potential start time assignments selected as the start time assignment is one of the potential start time assignments for which a worst case queuing delay is lowest. In at least some example embodiments, to determine the start time assignment, the set of instructions is configured to, when executed by the at least one processor, cause the apparatus to determine, for one of the data flows from a set of available time slots, a set of candidate time slots including ones of the available time slots which are not assigned to any of the data flows in the set of flows and for which the one of the data flows would not collide with any of the data flows in the set of data flows if the one of the data flows is assigned to that available time slot. In at least some example embodiments, the set of instructions is configured to, when executed by the at least one processor, cause the apparatus to determine, based on a determination that the set of candidate time slots is not empty, the respective start time for the one of the data flows based on a random selection of one of the candidate time slots for the one of the data flows. In at least some example embodiments, the set of instructions is configured to, when executed by the at least one processor, cause the apparatus to handle, based on a determination that the set of candidate time slots is empty, the one of the data flows including assigning one of the available time slots to the one of the data flows or preventing transmission of the one of the data flows. In at least some example embodiments, to determine the start time assignment, the set of instructions is configured to, when executed by the at least one processor, cause the apparatus to partition, by the controller, the data flows in the set of data flows into a set of data flow groups including respective subsets of the data flows in the set of data flows, determine, by the controller, a set of partial start time assignments for the respective data flow groups, wherein, for each of the respective data flow groups, the respective partial start time assignment for the respective data flow group is indicative of a set of start times for the respective data flows in the subset of data flows of the respective data flow group, and determine, by the controller based on a combination of the partial start time assignments, the start time assignment indicative of the set of start times at which the end hosts are to begin transmission of the respective data flows on the time synchronized network. In at least some example embodiments, the data flows are partitioned into the set of data flow groups randomly. In at least some example embodiments, the data flows are partitioned into the set of data flows based on a local search based partitioning. In at least some example embodiments, the local search based partitioning is based on a condition configured to measure whether moving one of the data flows from one of the data flow groups to another of the data flow groups results in a lower load in the one of the data flow groups. In at least some example embodiments, for at least one of the data flow groups, to determine the partial start time assignment for the respective data flow group, the set of instructions is configured to, when executed by the at least one processor, cause the apparatus to determine, for one of the data flows of the respective data flow group from a set of available time slots associated with the respective data flow group, a set of candidate time slots including ones of the available time slots associated with the respective data flow group which are not assigned to any of the data flows in the respective data flow group and for which the one of the data flows would not collide with any of the data flows in the respective data flow group if the one of the data flows is assigned to that available time slot associated with the respective data flow group. In at least some example embodiments, the set of available time slots associated with the respective data flow group includes a subset of a set of available time slots associated with the start time assignment and divided among the data flow groups. In at least some example embodiments, the set of available time slots associated with the respective data flow group includes a number of time slots that is, at most, a number of time slots in a set of available time slots associated with the start time assignment. In at least some example embodiments, the set of instructions is configured to, when executed by the at least one processor, cause the apparatus to determine, by the controller, whether the start time assignment is contention free. In at least some example embodiments, to determine whether the start time assignment is contention free, the set of instructions is configured to, when executed by the at least one processor, cause the apparatus to determine, by the controller for each of a plurality of switches of the time synchronized network, whether there is a potential contention at the switch for any of the data flows in any of a plurality of time slots of a time interval with which the start time assignment is associated. In at least some example embodiments, to determine whether the start time assignment is contention free, the set of instructions is configured to, when executed by the at least one processor, cause the apparatus to determine, by the controller for each pair of the data flows in the set of data flows, whether, at a first switch on a common shared path of a first data flow in respective pair of data flows and a second data flow in the respective pair of data flows, any packet of the first data flow in the respective pair of data flows arrives at the same time as any packet of the second data flow in the respective pair of data flows.

In at least some example embodiments, a non-transitory computer-readable medium stores a set of instructions configured to cause an apparatus to receive, by a controller of a time synchronized network from a set of end hosts of the time synchronized network, a set of requests by the end hosts to transmit data of a set of data flows on the time synchronized network, determine, by the controller based on a process, a start time assignment indicative of a set of start times at which the end hosts are to begin transmission of the respective data flows on the time synchronized network, and send, by the controller toward the set of end hosts, the start times at which the end hosts are to begin transmission of the respective data flows on the time synchronized network. In at least some example embodiments, for at least one of the start times at which the end hosts are to begin transmission of the respective data flows on the time synchronized network, the start time includes a respective time slot selected from a set of available time slots associated with a time interval for the respective data flow. In at least some example embodiments, to determine the start time assignment, the set of instructions is configured to cause the apparatus to determine, by the controller, a set of potential start time assignments, wherein each of the potential start time assignments includes a respective set of start times at which the end hosts are to begin transmission of the respective data flows on the time synchronized network and select, by the controller, one of the potential start time assignments as the start time assignment indicative of the set of start times at which the end hosts are to begin transmission of the respective data flows on the time synchronized network. In at least some example embodiments, for at least one of the potential start time assignments, the respective potential start time assignment is determined based on random selection from a set of available time slots associated with a time interval for the respective data flow. In at least some example embodiments, the one of the potential start time assignments selected as the start time assignment is one of the potential start time assignments for which a worst case queuing delay is lowest. In at least some example embodiments, to determine the start time assignment, the set of instructions is configured to cause the apparatus to determine, for one of the data flows from a set of available time slots, a set of candidate time slots including ones of the available time slots which are not assigned to any of the data flows in the set of flows and for which the one of the data flows would not collide with any of the data flows in the set of data flows if the one of the data flows is assigned to that available time slot. In at least some example embodiments, the set of instructions is configured to cause the apparatus to determine, based on a determination that the set of candidate time slots is not empty, the respective start time for the one of the data flows based on a random selection of one of the candidate time slots for the one of the data flows. In at least some example embodiments, the set of instructions is configured to cause the apparatus to handle, based on a determination that the set of candidate time slots is empty, the one of the data flows including assigning one of the available time slots to the one of the data flows or preventing transmission of the one of the data flows. In at least some example embodiments, to determine the start time assignment, the set of instructions is configured to cause the apparatus to partition, by the controller, the data flows in the set of data flows into a set of data flow groups including respective subsets of the data flows in the set of data flows, determine, by the controller, a set of partial start time assignments for the respective data flow groups, wherein, for each of the respective data flow groups, the respective partial start time assignment for the respective data flow group is indicative of a set of start times for the respective data flows in the subset of data flows of the respective data flow group, and determine, by the controller based on a combination of the partial start time assignments, the start time assignment indicative of the set of start times at which the end hosts are to begin transmission of the respective data flows on the time synchronized network. In at least some example embodiments, the data flows are partitioned into the set of data flow groups randomly. In at least some example embodiments, the data flows are partitioned into the set of data flows based on a local search based partitioning. In at least some example embodiments, the local search based partitioning is based on a condition configured to measure whether moving one of the data flows from one of the data flow groups to another of the data flow groups results in a lower load in the one of the data flow groups. In at least some example embodiments, for at least one of the data flow groups, to determine the partial start time assignment for the respective data flow group, the set of instructions is configured to cause the apparatus to determine, for one of the data flows of the respective data flow group from a set of available time slots associated with the respective data flow group, a set of candidate time slots including ones of the available time slots associated with the respective data flow group which are not assigned to any of the data flows in the respective data flow group and for which the one of the data flows would not collide with any of the data flows in the respective data flow group if the one of the data flows is assigned to that available time slot associated with the respective data flow group. In at least some example embodiments, the set of available time slots associated with the respective data flow group includes a subset of a set of available time slots associated with the start time assignment and divided among the data flow groups. In at least some example embodiments, the set of available time slots associated with the respective data flow group includes a number of time slots that is, at most, a number of time slots in a set of available time slots associated with the start time assignment. In at least some example embodiments, the set of instructions is configured to cause the apparatus to determine, by the controller, whether the start time assignment is contention free. In at least some example embodiments, to determine whether the start time assignment is contention free, the set of instructions is configured to cause the apparatus to determine, by the controller for each of a plurality of switches of the time synchronized network, whether there is a potential contention at the switch for any of the data flows in any of a plurality of time slots of a time interval with which the start time assignment is associated. In at least some example embodiments, to determine whether the start time assignment is contention free, the set of instructions is configured to cause the apparatus to determine, by the controller for each pair of the data flows in the set of data flows, whether, at a first switch on a common shared path of a first data flow in respective pair of data flows and a second data flow in the respective pair of data flows, any packet of the first data flow in the respective pair of data flows arrives at the same time as any packet of the second data flow in the respective pair of data flows.

In at least some example embodiments, a method includes receiving, by a controller of a time synchronized network from a set of end hosts of the time synchronized network, a set of requests by the end hosts to transmit data of a set of data flows on the time synchronized network, determining, by the controller based on a process, a start time assignment indicative of a set of start times at which the end hosts are to begin transmission of the respective data flows on the time synchronized network, and sending, by the controller toward the set of end hosts, the start times at which the end hosts are to begin transmission of the respective data flows on the time synchronized network. In at least some example embodiments, for at least one of the start times at which the end hosts are to begin transmission of the respective data flows on the time synchronized network, the start time includes a respective time slot selected from a set of available time slots associated with a time interval for the respective data flow. In at least some example embodiments, determining the start time assignment includes determining, by the controller, a set of potential start time assignments, wherein each of the potential start time assignments includes a respective set of start times at which the end hosts are to begin transmission of the respective data flows on the time synchronized network and selecting, by the controller, one of the potential start time assignments as the start time assignment indicative of the set of start times at which the end hosts are to begin transmission of the respective data flows on the time synchronized network. In at least some example embodiments, for at least one of the potential start time assignments, the respective potential start time assignment is determined based on random selection from a set of available time slots associated with a time interval for the respective data flow. In at least some example embodiments, the one of the potential start time assignments selected as the start time assignment is one of the potential start time assignments for which a worst case queuing delay is lowest. In at least some example embodiments, determining the start time assignment includes determining, for one of the data flows from a set of available time slots, a set of candidate time slots including ones of the available time slots which are not assigned to any of the data flows in the set of flows and for which the one of the data flows would not collide with any of the data flows in the set of data flows if the one of the data flows is assigned to that available time slot. In at least some example embodiments, the method includes determining, based on a determination that the set of candidate time slots is not empty, the respective start time for the one of the data flows based on a random selection of one of the candidate time slots for the one of the data flows. In at least some example embodiments, the method includes handling, based on a determination that the set of candidate time slots is empty, the one of the data flows including assigning one of the available time slots to the one of the data flows or preventing transmission of the one of the data flows. In at least some example embodiments, determining the start time assignment includes partitioning, by the controller, the data flows in the set of data flows into a set of data flow groups including respective subsets of the data flows in the set of data flows, determining, by the controller, a set of partial start time assignments for the respective data flow groups, wherein, for each of the respective data flow groups, the respective partial start time assignment for the respective data flow group is indicative of a set of start times for the respective data flows in the subset of data flows of the respective data flow group, and determining, by the controller based on a combination of the partial start time assignments, the start time assignment indicative of the set of start times at which the end hosts are to begin transmission of the respective data flows on the time synchronized network. In at least some example embodiments, the data flows are partitioned into the set of data flow groups randomly. In at least some example embodiments, the data flows are partitioned into the set of data flows based on a local search based partitioning. In at least some example embodiments, the local search based partitioning is based on a condition configured to measure whether moving one of the data flows from one of the data flow groups to another of the data flow groups results in a lower load in the one of the data flow groups. In at least some example embodiments, for at least one of the data flow groups, determining the partial start time assignment for the respective data flow group includes determining, for one of the data flows of the respective data flow group from a set of available time slots associated with the respective data flow group, a set of candidate time slots including ones of the available time slots associated with the respective data flow group which are not assigned to any of the data flows in the respective data flow group and for which the one of the data flows would not collide with any of the data flows in the respective data flow group if the one of the data flows is assigned to that available time slot associated with the respective data flow group. In at least some example embodiments, the set of available time slots associated with the respective data flow group includes a subset of a set of available time slots associated with the start time assignment and divided among the data flow groups. In at least some example embodiments, the set of available time slots associated with the respective data flow group includes a number of time slots that is, at most, a number of time slots in a set of available time slots associated with the start time assignment. In at least some example embodiments, the method includes determining, by the controller, whether the start time assignment is contention free. In at least some example embodiments, determining whether the start time assignment is contention free includes determining, by the controller for each of a plurality of switches of the time synchronized network, whether there is a potential contention at the switch for any of the data flows in any of a plurality of time slots of a time interval with which the start time assignment is associated. In at least some example embodiments, determining whether the start time assignment is contention free includes determining, by the controller for each pair of the data flows in the set of data flows, whether, at a first switch on a common shared path of a first data flow in respective pair of data flows and a second data flow in the respective pair of data flows, any packet of the first data flow in the respective pair of data flows arrives at the same time as any packet of the second data flow in the respective pair of data flows.

In at least some example embodiments, an apparatus includes means for receiving, by a controller of a time synchronized network from a set of end hosts of the time synchronized network, a set of requests by the end hosts to transmit data of a set of data flows on the time synchronized network, means for determining, by the controller based on a process, a start time assignment indicative of a set of start times at which the end hosts are to begin transmission of the respective data flows on the time synchronized network, and means for sending, by the controller toward the set of end hosts, the start times at which the end hosts are to begin transmission of the respective data flows on the time synchronized network. In at least some example embodiments, for at least one of the start times at which the end hosts are to begin transmission of the respective data flows on the time synchronized network, the start time includes a respective time slot selected from a set of available time slots associated with a time interval for the respective data flow. In at least some example embodiments, the means for determining the start time assignment includes means for determining, by the controller, a set of potential start time assignments, wherein each of the potential start time assignments includes a respective set of start times at which the end hosts are to begin transmission of the respective data flows on the time synchronized network and means for selecting, by the controller, one of the potential start time assignments as the start time assignment indicative of the set of start times at which the end hosts are to begin transmission of the respective data flows on the time synchronized network. In at least some example embodiments, for at least one of the potential start time assignments, the respective potential start time assignment is determined based on random selection from a set of available time slots associated with a time interval for the respective data flow. In at least some example embodiments, the one of the potential start time assignments selected as the start time assignment is one of the potential start time assignments for which a worst case queuing delay is lowest. In at least some example embodiments, the means for determining the start time assignment includes means for determining, for one of the data flows from a set of available time slots, a set of candidate time slots including ones of the available time slots which are not assigned to any of the data flows in the set of flows and for which the one of the data flows would not collide with any of the data flows in the set of data flows if the one of the data flows is assigned to that available time slot. In at least some example embodiments, the apparatus includes means for determining, based on a determination that the set of candidate time slots is not empty, the respective start time for the one of the data flows based on a random selection of one of the candidate time slots for the one of the data flows. In at least some example embodiments, the apparatus includes means for handling, based on a determination that the set of candidate time slots is empty, the one of the data flows including assigning one of the available time slots to the one of the data flows or preventing transmission of the one of the data flows. In at least some example embodiments, the means for determining the start time assignment includes means for partitioning, by the controller, the data flows in the set of data flows into a set of data flow groups including respective subsets of the data flows in the set of data flows, means for determining, by the controller, a set of partial start time assignments for the respective data flow groups, wherein, for each of the respective data flow groups, the respective partial start time assignment for the respective data flow group is indicative of a set of start times for the respective data flows in the subset of data flows of the respective data flow group, and means for determining, by the controller based on a combination of the partial start time assignments, the start time assignment indicative of the set of start times at which the end hosts are to begin transmission of the respective data flows on the time synchronized network. In at least some example embodiments, the data flows are partitioned into the set of data flow groups randomly. In at least some example embodiments, the data flows are partitioned into the set of data flows based on a local search based partitioning. In at least some example embodiments, the local search based partitioning is based on a condition configured to measure whether moving one of the data flows from one of the data flow groups to another of the data flow groups results in a lower load in the one of the data flow groups. In at least some example embodiments, for at least one of the data flow groups, the means for determining the partial start time assignment for the respective data flow group includes means for determining, for one of the data flows of the respective data flow group from a set of available time slots associated with the respective data flow group, a set of candidate time slots including ones of the available time slots associated with the respective data flow group which are not assigned to any of the data flows in the respective data flow group and for which the one of the data flows would not collide with any of the data flows in the respective data flow group if the one of the data flows is assigned to that available time slot associated with the respective data flow group. In at least some example embodiments, the set of available time slots associated with the respective data flow group includes a subset of a set of available time slots associated with the start time assignment and divided among the data flow groups. In at least some example embodiments, the set of available time slots associated with the respective data flow group includes a number of time slots that is, at most, a number of time slots in a set of available time slots associated with the start time assignment. In at least some example embodiments, the apparatus includes means for determining, by the controller, whether the start time assignment is contention free. In at least some example embodiments, the means for determining whether the start time assignment is contention free includes means for determining, by the controller for each of a plurality of switches of the time synchronized network, whether there is a potential contention at the switch for any of the data flows in any of a plurality of time slots of a time interval with which the start time assignment is associated. In at least some example embodiments, the means for determining whether the start time assignment is contention free includes means for determining, by the controller for each pair of the data flows in the set of data flows, whether, at a first switch on a common shared path of a first data flow in respective pair of data flows and a second data flow in the respective pair of data flows, any packet of the first data flow in the respective pair of data flows arrives at the same time as any packet of the second data flow in the respective pair of data flows.

In at least some example embodiments, an apparatus includes at least one processor and at least one memory including a set of instructions, wherein the set of instructions is configured to, when executed by the at least one processor, cause the apparatus to send, by an end host of a time synchronized network toward a controller of the time synchronized network, a request by the end host to transmit data of a data flow on the time synchronized network, receive, by the end host from the controller, a response including a start time for the data flow, wherein the start time for the data flow is indicative of a time at which the end host is to begin transmission of the data of the data flow on the time synchronized network, and initiate, by the end host at the start time for the data flow, transmission of data of the data flow on the time synchronized network.

In at least some example embodiments, a non-transitory computer-readable medium stores a set of instructions configured to cause an apparatus to send, by an end host of a time synchronized network toward a controller of the time synchronized network, a request by the end host to transmit data of a data flow on the time synchronized network, receive, by the end host from the controller, a response including a start time for the data flow, wherein the start time for the data flow is indicative of a time at which the end host is to begin transmission of the data of the data flow on the time synchronized network, and initiate, by the end host at the start time for the data flow, transmission of data of the data flow on the time synchronized network. In at least some example embodiments, a method includes sending, by an end host of a time synchronized network toward a controller of the time synchronized network, a request by the end host to transmit data of a data flow on the time synchronized network, receiving, by the end host from the controller, a response including a start time for the data flow, wherein the start time for the data flow is indicative of a time at which the end host is to begin transmission of the data of the data flow on the time synchronized network, and initiating, by the end host at the start time for the data flow, transmission of data of the data flow on the time synchronized network. In at least some example embodiments, an apparatus includes means for sending, by an end host of a time synchronized network toward a controller of the time synchronized network, a request by the end host to transmit data of a data flow on the time synchronized network, means for receiving, by the end host from the controller, a response including a start time for the data flow, wherein the start time for the data flow is indicative of a time at which the end host is to begin transmission of the data of the data flow on the time synchronized network, and means for initiating, by the end host at the start time for the data flow, transmission of data of the data flow on the time synchronized network.

BRIEF DESCRIPTION OF THE DRAWINGS

The teachings herein can be readily understood by considering the following detailed description in conjunction with the accompanying drawings, in which:

FIG. 2 depicts an example embodiment of pseudocode for a randomized algorithm configured to select a set of flow start time assignments for a set of flows in a time synchronized network;

FIG. 3 depicts an example embodiment of pseudocode for a greedy algorithm configured to select a set of flow start time assignments for a set of flows in a time synchronized network;

FIG. 4 depicts an example embodiment of pseudocode for a random-greedy algorithm configured to select a set of flow start time assignments for a set of flows in a time synchronized network;

FIG. 5 depicts an example embodiment of pseudocode for a local-greedy algorithm configured to select a set of flow start time assignments for a set of flows in a time synchronized network;

To facilitate understanding, identical reference numerals have been used herein, wherever possible, in order to designate identical elements that are common among the various figures.

DETAILED DESCRIPTION

Figure 1:
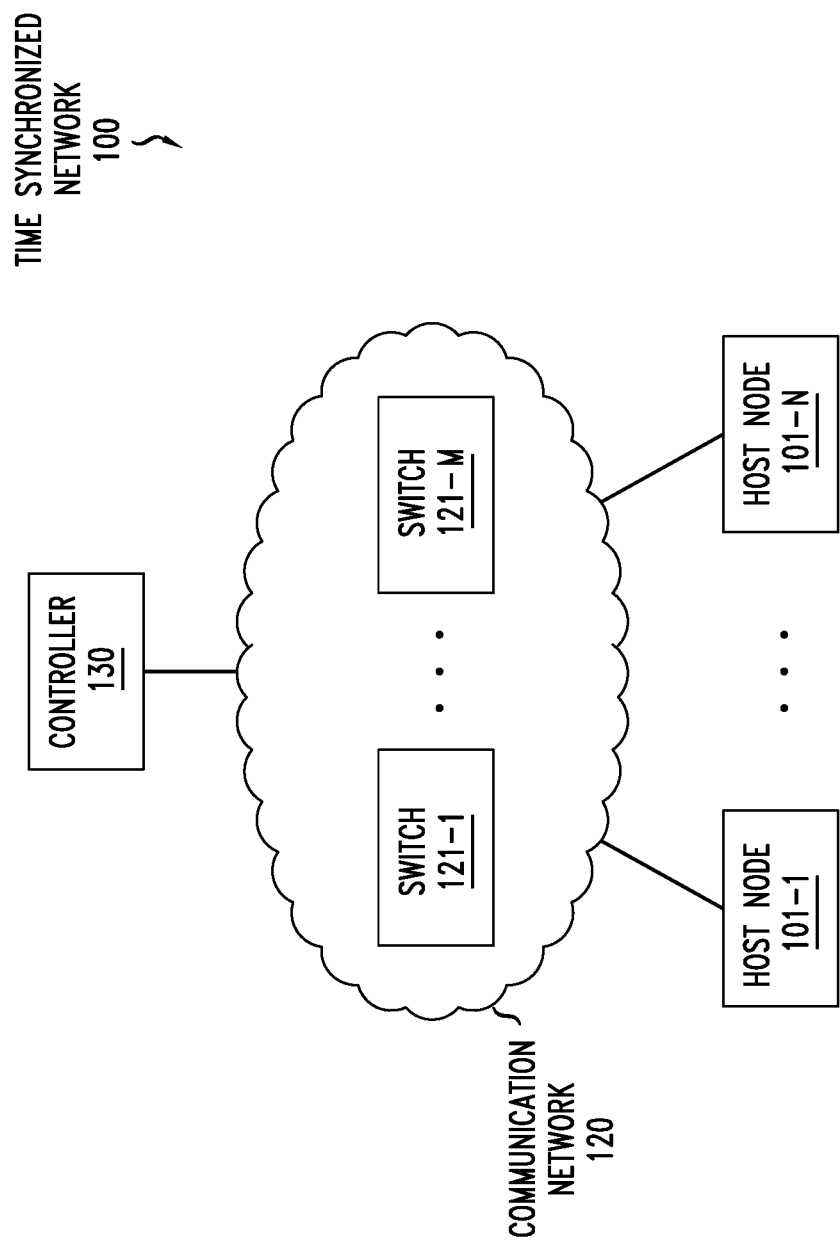
FIG. 1 depicts an example embodiment of a time synchronized network configured to support transmission of deterministic flows based on scheduling of the transmission of the deterministic flows in the time synchronized network.

Various example embodiments for supporting scheduling of deterministic flows in time synchronized networks are presented. Various example embodiments for supporting scheduling of deterministic flows in a time synchronized network may be configured to support scheduling of deterministic flows in the time synchronized network based on assignment of transmission start times to data flows of communication devices such that the communication devices may transmit data of the data flows at the transmission start times in a manner tending to reduce or eliminate collisions in the time synchronized network. Various example embodiments for supporting scheduling of deterministic flows in a time synchronized network may be configured to support scheduling of deterministic flows in the time synchronized network based on a controller that is configured to determine assignment of transmission start times to data flows of communication devices based on use of various algorithms (which also may be referred to herein as processes or methods). Various example embodiments for supporting scheduling of deterministic flows in a time synchronized network may be configured to support scheduling of deterministic flows in the time synchronized network based on communication devices that are configured to send requests to the controller for assignment of transmission start times for data flows of the communication devices, receive response from the controller that include indications of transmission start times assigned by the controller for the data flows of the communication devices, and initiate transmission of data of the data flows of the communication devices at the transmission start times assigned for the data flows of the communication devices. It is noted these and various other example embodiments and advantages or potential advantages of supporting scheduling of deterministic flows in time synchronized networks may be further understood by way of reference to the various figures, which are discussed further below.

Various example embodiments may be configured to support transmission scheduling of time-triggered cyclic traffic through a network of synchronized switches. The scheduling may be performed in a manner that provides deterministic and bounded end-to-end latency and jitter guarantees. Such stringent guarantees may be necessary or desirable in various contexts, such as for supporting real-time, closed-loop industrial monitoring, control, and optimization applications that may rely on periodicity and relatively high determinism. For example, such applications may include motion control applications (e.g., printing machines, machine tools, packaging machines, or the like), mobile robot applications (e.g., cooperative motion control, video-operated remote control, or the like), mobile control panels with safety functions (e.g., assembly robots, milling machines, mobile cranes, or the like), process monitoring, or the like, as well as various combinations thereof.

Various example embodiments may be configured to support such guarantees for such applications based on efficient flow transmission schedules that minimize or eliminate worst-case per packet network queuing delays while ensuring high throughput for flows. The flows are periodic and time sensitive, and the packets of the flows arrive following fixed schedules and need to be delivered through the network by specified hard deadlines. Here, it is assumed that the flows are handled such that all packets of the same flow take the same path through the network and the flow paths for the flows are determined in a manner such that the flow paths do not change (e.g., based on shortest paths, spanning trees, or other extrinsic network properties). It will be appreciated that, although primarily presented with respect to use of fixed flow paths, various example embodiments for supporting scheduling of deterministic flows may be applied to networks in which the flow paths are not necessarily fixed (e.g., in networks which may use intelligent path selection, such as based on use of centralized control, segment routing, or the like, as well as various combinations thereof).

Various example embodiments may be configured to support such guarantees for such applications based on efficient flow transmission schedules that are based on packet arrival schedules. The flows are highly regular and non-bursty. In particular, the flows are periodic flows in which the same packet arrival schedule is repeated from period to period. It is assumed that the per-period packet arrival process of each flow is known in advance. Thus, for these flows, the entire packet arrival process can be computed from just the flow start time. This is the time at which the source host starts injecting packets for the flow into the network. For instance, consider a simple periodic flow where a packet arrives every T seconds. This flow has a period of T and, if it is known that the first packet of the flow arrives at time t, then it is known that the other packets for this flow arrive at times T+t, 2T+t, and so forth. In general, the packet arrival schedule may be much more complex: there may be many more packets per period and their arrival times within the period may be non-regular; however, even then, with knowledge of the start time of the flow and the packet arrival schedule of the flow within a period, the entire packet arrival process of the flow can be fully determined.

Various example embodiments for supporting scheduling of deterministic flows in time synchronized networks may be further understood by considering three types of network delays for packets: propagation delay, processing delay, and queuing delay. The propagation delay of a packet is the sum of the per-hop propagation delays on the flow path of the packet. Herein, it is assumed that propagation delays are distance-based static delays that can be precisely measured and are known for each hop. The processing delay of a packet is the processing delay for the packet in the intermediate switches on the flow path of the packet. Herein, it is assumed that a switch takes the same time to process any packet and that this time is known for each switch. The queuing delay of a packet is the queuing delay for the packet in the intermediate switches on the flow path of the packet. It is noted that the queuing delay for a switch varies in direct proportion to the number of packets waiting to be processed by the switch, and that it depends very much on the start times and the per period packet arrival schedules of the flows.

The total network delay for a packet is the sum of the propagation delay, the processing delay, and the queuing delay on the flow path of the packet. The first two are deterministic, but the latter depends on flow start times. Assuming an "ideal" flow schedule (for an ideal choice of flow start times) in which no two packets arrive at a switch at the same time, there should be no queuing delay. In such a case, the end-to-end "ideal" network delay for a flow that is forwarded on a path with m hops (links) is:

$$D = \sum_{i=1}^{m} PD_i + \sum_{i=1}^{m-1} p_i,$$

where $PD_i$ is the propagation delay on the i-th link on the flow path and $p_i$ is the packet processing time for the i-th switch on the flow path. Thus, in ideal schedules (with zero queuing delays), flow delays are fully deterministic: all packets of the flow experience the same delay (D) and there is no jitter at all. It is noted that the flow delay in an ideal schedule (D) is also the minimum possible delay for the flow in any flow schedule, as it only includes the propagation and processing delays. This means that a flow with ideal delay D can only be supported by the network if the delay budget b of the flow satisfies b≥D. Herein, it is assumed that this is the case for all flows. Since the flow paths and the packet arrival schedules of the flows are fixed, the only parameter that can be adjusted is the flow start times of the flows. As such, in at least some example embodiments, the goal may be to schedule the flow start times for all flows to minimize the worst case wait time for flow packets within the network switches. It will be appreciated that, although primarily presented herein within the context of periodic flows, various example embodiments for supporting scheduling of deterministic flows in time synchronized networks may be extended, more generally, to other types of deterministic flows where the (full) flow packet arrival schedule is known in advance.

It will be appreciated that these and various other example embodiments for supporting scheduling of deterministic flows in time synchronized networks may be further understood by considering an example time synchronized network as presented with respect to FIG. 1.

FIG. 1 depicts an example embodiment of a time synchronized network configured to support transmission of deterministic flows based on scheduling of the transmission of the deterministic flows in the time synchronized network.

The time synchronized network 100 is configured to support communication of flow traffic based on time synchronization among various devices including end devices and network devices. The time synchronized network 100 is configured to support communication of flow traffic, based on time synchronization among various devices including end devices and network devices, based on transmission of the flow traffic according to a schedule. The time synchronized network may include any network, including any wireline network and/or wireless network, which may support communication of flow traffic, based on time synchronization among various devices including end devices and network devices, based on transmission of the flow traffic according to a schedule. For example, the time synchronized network may be a time sensitive network based on IEEE 802 standards (e.g., deterministic real-time IEEE 802 networks, such as networks based on the IEEE 802.1Qbv standard for scheduled traffic and/or other IEEE standards, where precise clock synchronization of switches and end systems may be used to schedule the forwarding of frames in the switched network and frames are injected into the switched network by the sources, such as network interface controllers (NICs), at precisely defined points in time according to a schedule). It will be appreciated, as indicated above, that such time synchronized networks may be used in various contexts, such as in industrial automation applications, motion control applications, mobile robot applications, autonomous driver applications, processing monitoring applications, IoT applications, and so forth. It will be appreciated that time synchronized networks such as time synchronized network 100 may be used to support communications between various types of elements within various other applications and contexts.

The time synchronized network 100 includes a set of host nodes 101-1 to 101-N (collectively, host nodes 101), a communication network 120, and a controller 130.

The host nodes 101, which are the sources and sinks of flow traffic, are connected through the communication network 120. The host nodes 101 operating as sources of flow traffic request transmission scheduling information from the controller 130, receive transmission scheduling information from the controller 130, and inject packets into the communication network 120 based on the transmission scheduling information from the controller 130. The host nodes 101 operating as sources of flow traffic inject traffic into the network according to a fixed schedule received from the controller 130 and the packets are carried over the communication network 120 and delivered to the destination host nodes 101 at deterministic times according to the fixed schedule. The host nodes 101 may include any elements which may communicate via a time synchronized network. For example, the host nodes 101 may include various nodes which may be involved in the communication of flow traffic in various contexts in which time synchronized networks may be employed (e.g., computers, sensors, actuators, robots, network interface cards (NICs), virtual machines (VMs), and so forth).

The communication network 120 supports communication of data of data flows of the host nodes 101. The communication network 120 supports communication of data of data flows of the host nodes 101 based on time synchronization within the communication network 120. The communication network 120 includes a set of switches 121-1 to 121-M (collectively, switches 121). The communication network 120 may support unicast communications (e.g., in order to support various applications in which a pair of communication devices communicate with each other), in which case the switches 121 may provide well-defined and fixed paths between any pair of host nodes 101. The communication network 120 may support multicast communications (e.g., in order to support various applications in which one element may send data to multiple other elements, such as in closed loop motion control applications where a leader sends periodic updates simultaneously to multiple followers), in which case there may be well-defined paths between any group of host nodes 101 in the form of a multicast tree from one source to multiple sinks. In the communication network 120, packets may be forwarded by the switches 121 in first come first serve (FCFS) order. The packets waiting to be forwarded at a switch 121 are held in a FCFS queue. If multiple packets arrive at a switch 121 at the same time, then the packets are added to the FCFS queue in a deterministic order (e.g. based on flow ranking). It is noted that, just before delivery to the destination host node 121, the packets may be held in a jitter buffer where the packets wait until the time for their delivery to the destination host nodes 101. The jitter buffer removes delay variations within the communication network 120 that are experienced by packets of a given flow. It will be appreciated that such delay variations may be due to the different queuing delays that the packets of the same flow may experience through the communication network 120. These network queuing delays may be mitigated by the flow schedule determined by the controller 130 and used by the host nodes 101, thereby reducing or eliminating the need for the jitter buffers in the communication network 120 (although it will be appreciated that jitter buffers may still be used to ensure that the communication network 120 can provide deterministic end-to-end delays and zero packet jitter).

The controller 130 is configured to operate as a flow scheduler for scheduling data flows of the host nodes 101 through the communication network 120. The controller 130 maintains global knowledge of the communication network 120 (e.g. topology, propagation delays, switch processing delays, and the like) and the set of active flows (e.g. the per-period arrival schedules of the flows). The host nodes 101 request the controller 130 to allocate start times for their flows and start injecting packets for their flows into the communication network 120 at the allocated start times determined by the controller 130. The host nodes 101 also inform the controller 130 when their flows have been completed. The operation of the controller 130 in allocating the start times for the flows of the host nodes 101 may be further understood by considering the following network model.

In the model, consider a set F of n periodic flows denoted by $F=\{f_1, f_2 \ldots f_n\}$. Each flow f is characterized by a tuple (T(f); S(f); m(f); P(f). Here, T(f) denotes the period of the flow and S(f) denotes the packet arrival schedule within the first period of the flow (and, thus, for all periods, as the per period packet arrival schedule does not change from period to period) with $|S(f)|$ denoting the number of packets that arrive in the first period. S(f) is defined in terms of the relative arrival times of the packets with respect to the first packet of the first period. In particular, for $|S(f)|=m$ packets, the period arrival schedule S(f) is the ordered set of relative arrival times $S(f)=\{t_1, t_2 \ldots t_n\}$, where $t_i$ is the time between the arrival of the i-th packet and the first packet in S(f). Here, $t_1 \leq t_2 \leq t_n$. It is noted that $t_1=0$, since all times are measured relative to the first packet. Note that, given the absolute arrival time of the first packet in SW, the absolute arrival time of all its packets can be determined from its period T(f) and arrival schedule S(f). As an example, consider a simple periodic flow where only one packet arrives per time period. Hence, for such flows $|S(f)|=1$ and $t_1=0$ and, therefore $S(f)=\{0\}$.

Flows $f \in F$ have a minimum start time denoted by m(f). This is the earliest time that flow f can start and it should not be delayed more than a period from its minimum start time. As such, its start time must lie in the interval [m(f), m(f)+T(f)]. Here, m(f) can be thought of as the time when the end host makes a request to the central scheduler to grant it a start time for its flow f. The central scheduler has maximum leeway of T(f) time units for delaying the start of flow f. We denote by P(f) the network path for flow f. |P| denotes the number of directed links on path P. That is $P=e_1, e_2, \ldots, e_{|P|}$, with $e_i$ being the i-th link on path P. The propagation delay of a link l is denoted by DP(l). P can also be specified in terms of its switches as $P=r_1, r_2, \ldots r_{|P|-1}$. Here $r_i$ is the i-th switch on path P. The per packet processing time for switch r is denoted by p(r). We assume the switch processing times are independent of packet sizes. The begin and end switches of P are denoted by B(P) and E(P), respectively, and the corresponding source and destination hosts are denoted by F(P) and L(P).

The model introduced above may be further understood by considering a specific application of this model to an Internet-of-Things (IoT) environment.

In this IoT model, it is assumed that the network links operate at 10G, the flow packets are at most 100 bytes (most industrial IoT periodic closed loop scenarios use small packets), and the switch per packet processing and forwarding times are 100 ns (approximately the time it takes to process 100 bytes at 10G speeds).

In this IoT model, it is assumed that the network switches forward packets by matching input ports to output ports. As a result, as long as there is at most one packet arrival per port and there is at most one packet departure per port (called the matching condition), the packets can be forwarded as they arrive. With this assumption, the only delay incurred by the packets within the switch is the forwarding (processing) time. However, any time the matching conditions are violated, at least one packet cannot be forwarded on arrival and must wait for its turn in the next round of matching of input and output ports. Such packets must incur an additional queuing delay at the switch.

In this IoT model, it is assumed that the entire network operates in equal-sized time slots. That is, all scheduling and packet forwarding happens within time slots. It is assumed that the time slot size $\tau=100$ ns, as this is the time for processing and switching 100 byte packets in 10G switches. Flows are scheduled to start at the beginning of these slots. Thus, flow start times are multiples of $\tau$.

In this IoT model, the flow periods T(f) are specified in milliseconds. Thus, T(f) for any flow f is n milliseconds for some positive number n. Typically n ranges from 1-100 ms in industrial applications.

In this IoT model, the following flow path assumptions are made. It is assumed that flows are routed on shortest paths. By their very nature, shortest paths are confluent, meaning that a shortest path has only one outgoing link at each switch node. This confluent condition holds for all flow paths. It is also assumed that network shortest paths are unique. This has the consequence that two flows can only merge at most once, meaning that, if two flow paths meet and merge at a switch, although they can stay merged through a set of common switches and then separate again at another switch, after that then they cannot merge back again at another switch. A formal proof of this is provided hereinbelow with respect to Lemma 4. It is assumed that there are, at most, five hops on each flow path.

It will be appreciated that, although some of the assumptions and numbers used herein are based on an IoT setting, various example embodiments presented herein may be extended to various other contexts where these assumptions and/or numbers may be different.

As described herein, various example embodiments may be configured to support guarantees for applications based on efficient flow transmission schedules that minimize or eliminate worst-case per packet network queuing delays while ensuring high throughput for flows. This may include finding an assignment A of start times s(f) to flows f∈F to minimize or eliminate queuing delays at the switches. Recall that the start time s(f) for a flow f∈F, whose minimum start time is m(f), needs to be a time slot (of length $\tau$) contained (fully or partially) within the interval I(f)=[m(f), m(f)+T($f_t$)].

In other words, only time slots that have an overlap with interval I(f) are candidates for s(f). This set of allowed, or candidate, start times for flow f may be denoted by C(f). Note that the number of allowed slots |C(f)| for flow f is approximately T($f_t$)/$\tau$ slots. The determination of the assignment A of start times s(f) to flows f∈F, to minimize or eliminate queuing delays at the switches, may be performed in a number of ways. In at least some example embodiments, the determination of the assignment A of start times s(f) to flows f∈F to minimize or eliminate queuing delays at the switches, may be performed using a randomized algorithm (e.g., which also may be referred to herein as a randomized process or method, and an example of which is presented with respect to FIG. 2) that is configured to pick a random assignment of flow start times. The solution that is picked by the randomized algorithm is quite good in practice even though the probability of a feasible assignment, even when non-zero, may be quite small (e.g., as discussed hereinbelow with respect to Lemma 7). In at least some example embodiments, the determination of the assignment A of start times s(f) to flows f∈F, to minimize or eliminate queuing delays at the switches, may be performed using a greedy algorithm (e.g., which also may be referred to herein as a greedy process or method, and an example of which is presented with respect to FIG. 3). The greedy algorithm can be thought as a partial de-randomization of the randomized algorithm. The greedy algorithm is able to find a wait-free solution under some mild assumptions (e.g., as established hereinbelow in Lemma 9). In at least some example embodiments, such as for a more general case in which the assumptions associated with the greedy algorithm (e.g., as established hereinbelow in Lemma 9) do not necessarily hold, the determination of the assignment A of start times s(f) to flows f∈F, to minimize or eliminate queuing delays at the switches, may be performed using a random-greedy algorithm (e.g., which also may be referred to herein as a random-greedy process or method, and an example of which is presented with respect to FIG. 4), based on random partitioning of flows, that is able to find a wait-free solution. The random-greedy algorithm uses extra switch capacity proportional to the factor by which the conditions in Lemma 10 are violated; however, the random-greedy guarantees of finding a wait-free solution may only hold in expectation. In at least some example embodiments, the determination of the assignment A of start times s(f) to flows f∈F, to minimize or eliminate queuing delays at the switches, may be performed using a local-greedy algorithm (e.g., which also may be referred to herein as a local-greedy process or method, and an example of which is presented with respect to FIG. 5), which also may be referred to herein as a local search algorithm, that is always able to find a wait-free solution. The local-greedy algorithm is guaranteed to find a wait-free solution, but may require use of additional switch capacity than what is required for a wait-free solution; however, its use of additional switch capacity is bounded. In particular, the local-greedy algorithm is an f-approximation algorithm as it uses no more than f times the optimal switch capacity needed for a wait-free solution. Here, f represents the factor by which the conditions in Lemma 10 are violated. It may be shown that f may be upper-bounded by the maximum number of hops for the flow paths. It is noted that, in at least some example embodiments, a more practical version of the local-greedy algorithm, in which the running time is improved based on use of slightly more switch capacity, is provided based on use of an error tolerance parameter (∈<1) to control the tradeoff between running time and switch capacity that is used. As illustrated further below, each of the above-referenced algorithms may be computationally efficient with fast implementations. It is noted that, in general, the problem of finding the assignment A of start times s(f) to flows f∈F to minimize or eliminate queuing delays at the switches is NP-hard (i.e., it can be reduced to NP hard no-wait job scheduling), so it is not expected to be able to solve the problem optimally with an efficient algorithm. It is further noted that, although each of the above-referenced algorithms apply to general flows, for purposes of various proofs, feasibility analysis, and performance bounds presented herein, simple period flows (e.g., a simple periodic flow f is one where a packet arrives every T(f) seconds and T(f) is not assumed to be fixed but may be flow dependent) are assumed.

In at least some example embodiments, as indicated hereinabove, the determination of the assignment A of start times s(f) to flows f∈F to minimize or eliminate queuing delays at the switches may be performed using a randomized algorithm that is configured to pick a random assignment of flow start times. The assignment of flow start times by the randomized algorithm is through random selection of time slots from sets C(f). In particular, the randomized algorithm constructs a flow start time assignment A by setting the start time s(f) for flow f∈F to a randomly drawn time slot from the set C(f). The algorithm constructs N such flow start time assignments $\{A_1, A_2, \ldots, A_N\}$ and selects one of the N flow start time assignments as the flow start time assignment A to be used. The one of the N flow start time assignments selected as the flow start time assignment A to be used may be the one of the flow start time assignments for which the worst queuing delay is the least. It will be appreciated that the one of the N flow start time assignments selected as the flow start time assignment A to be used may be selected based on one or more other criteria for evaluating the N flow start time assignments. The randomized algorithm returns the selected flow start time assignment A as the flow start time assignment to be applied to the network. It is noted that, in practice, N does not need to be very large as, typically, a good solution may be obtained with just a few hundred assignments (although it will be appreciated that N may be smaller or larger). It is noted that pseudocode representing the randomized algorithm discussed above is illustrated in FIG. 2 as randomized algorithm pseudocode 200.

In at least some example embodiments, as indicated hereinabove, the determination of the assignment A of start times s(f) to flows f∈F to minimize or eliminate queuing delays at the switches may be performed using a greedy algorithm. In the greedy algorithm, it is assumed that two flows $f_a$ and $f_b$ with start times of $s(f_a)$ and $s(f_b)$, respectively, collide if at least one packet of flow $f_a$ arrives at a switch at the same time that a packet of flow $f_b$ arrives at that switch and both these packets depart the switch over the same outgoing link. The greedy algorithm performs a greedy assignment of start times. For this, the greedy algorithm goes over the flows in an arbitrarily chosen but fixed order $f_1, f_2, \ldots$. In the greedy algorithm, the set $F_i$, i>0 denotes the set of flows $f_1, f_2, \ldots, f_i$ that have been processed so far and $F_0=\emptyset$. The greedy algorithm, when processing a flow $f_i$, sets the start time s(f) of flow $f_i$ to a random slot in $C(f_i) \setminus R_i$ which is the set of the slots at which flow $f_i$ can be started without colliding with any of the flows in $F_{i-1}$. It is shown hereinbelow that the greedy algorithm is guaranteed to find a wait-free schedule if the conditions established in Lemma 9 hold. In particular, in this case $C(f_i) \setminus R_i \neq \emptyset$ for any i and, thus, line 6 of the algorithm is not executed. In other words, as long as the conditions established in Lemma 9 hold, the greedy algorithm returns a non-empty collision-free flow start time assignment A. It is noted that the handling of the case in which the conditions established in Lemma 10 do not hold is provided hereinbelow (e.g., the flows are partitioned into a smaller number of groups such that the conditions established in Lemma 10 hold for flows within a group and, thus, the greedy algorithm can be used to find a contention-free start time assignment A for flows within each group). It is noted that pseudocode representing the greedy algorithm discussed above is illustrated in FIG. 3 as greedy algorithm pseudocode 300.

In at least some example embodiments, as indicated hereinabove, the determination of the assignment A of start times s(f) to flows f∈F to minimize or eliminate queuing delays at the switches may be performed using a random-greedy algorithm.

The random-greedy algorithm may be further understood by first considering that the greedy algorithm may not find a wait-free schedule if the conditions established in Lemma 10 do not hold. In particular, this can be if, for some flow $$f_i, \sum_{j \neq i} 1/[gcd(T(f_i), T(f_j))] > 1.$$

Here, in the subscript, only those flows $f_i$ with which flow $f_j$ contends are included. Let $$\sum_{j \neq i} 1/[gcd(T(f_i), T(f_j))] \leq S$$

hold for all flows $f_i$ and where S is the smallest integer for which these conditions hold. The random-greedy algorithm uses, at most, S times more processing capacity per switch than the minimum amount of capacity needed to serve all flows traversing the switch using the best possible scheduling algorithm. The random-greedy algorithm has an additional step of randomly partitioning the set of flows into f groups $G_1, G_2, \ldots, G_S$ such that, for any flow $f_i$ within group $G_k$, the following condition holds (where E stands for expectation):

$$E_{f_j \in G_k} \left( \sum_{j \neq i, f_j \in G_k} 1/[gcd(T(f_i), T(f_j))] \right) \leq 1.$$

Here, in the subscript, only those flows $f_i$ with which flow $f_j$ contends are included. It is noted that, if the above condition holds, within each group $G_i$, not just in expectation but also for the actual solution found by the random-greedy algorithm, then the greedy algorithm can be used to find, independently for each group $G_i$, a wait-free schedule of all the flows within the group $G_i$. Then, by scheduling flows of a group independently using dedicated slots for the group within each switch a wait-free solution is obtained for all flows. Such solution, in the worst case, requires no more than S times the switch slots needed by the optimal wait-free solution, which implies that it is a S-approximation algorithm for wait-free scheduling. It will be appreciated, as discussed further below, that the S partitioning of the flows may be determined in a number of ways.

The random-greedy algorithm, as indicated above, may be based on the S partitioning of the flows. Consider a weighted graph G=(V,E) whose nodes V are the set of flows and in which there is an undirected edge e=(i,j)∈E between every node pair i and j of weight w(e). The edge weight w(e)=0 if the corresponding flows $f_i$ and $f_j$ do not contend at any switch; otherwise, edge weight w(e)=1/[gcd(T($f_i$), T($f_j$))]. It is noted that, in G, the total weight of all edges on a node i is $$\sum_{j \neq i} 1/[gcd(T(f_i), T(f_j))] \leq S.$$

Here, in the subscript, only those flows $f_i$ with which flow $f_j$ contends are included.

The random-greedy algorithm randomly (e.g., i.i.d.) partitions the nodes of G into S partitions $G_1, G_2, \ldots G_S$. In other words, the random-greedy algorithm independently places node i into partition $G_k$ with probability 1/S. Let $E_1, E_2, \ldots E_S$ be the partitioning of those edges of G whose endpoints are contained within a single partition. In other words, $E_i \subseteq E$ is the set of edges e=(u, v)∈E such that both nodes u and v are in the i-th partition $G_i$. Lemma 1 states that, for a node i in partition $G_k$, the expected weight of the edges in $E_k$ incident on i is at most one. A proof of Lemma 1 follows. Consider an edge e=(i,j)∈E. The probability that node j is in partition $G_k$ with node i is 1/S. Thus, in expectation edge e contributes weight w(e)/S toward the sum of the weights of the edges in $E_k$ that are incident on node i in partition $G_k$. By linearity of expectation, the expected weight of the edges in $E_k$ incident on i is at most: $\Sigma_{e=(i,j)\in E} w(e)/S \leq S/S = 1$. From Lemma 1, it follows that the flow partition $G_1, G_2, \ldots G_S$ found by the random-greedy algorithm satisfies the expectation:

$$E_{f_j \in G_k}\left(\sum_{j \neq i, f_j \in G_k} 1/[gcd(T(f_i), T(f_j))]\right) \leq 1.$$

Here, in the subscript, only those flows $f_i$ with which flow $f_j$ contends are included.

It is noted that pseudocode representing the random-greedy algorithm discussed above is illustrated in FIG. 4 as random-greedy algorithm pseudocode 400.

In at least some example embodiments, as indicated hereinabove, the determination of the assignment A of start times s(f) to flows f∈F to minimize or eliminate queuing delays at the switches may be performed using a local-greedy algorithm.

The local-greedy algorithm, as indicated above, may be based on the S partitioning of the flows. The local-greedy algorithm may be configured such that the partition $G_1, G_2, \ldots G_S$ of the nodes of G always satisfies the conditions (not just in expectation) of Lemma 10 for any partition $G_k$ and any node i∈$G_k$ (where, again, it is noted that the nodes correspond to flows):

$$\sum_{j \neq i, f_j \in G_k} w((i, j)) \leq 1.$$

It is noted that this implies that $$\sum_{j \neq i, f_j \in G_k} 1/[gcd(T(f_i), T(f_j))] \leq 1.$$

Here, in the subscript, only those flows $f_i$ with which flow $f_j$ contends are included. As previously indicated, with a flow (node) partition that satisfies these conditions, a wait-free flow schedule is guaranteed to be found using the greedy algorithm with at most S times extra switch capacity.

The local-greedy algorithm may be further understood by considering the following functions. For a given partition P=$G_1, G_2, \ldots G_S$ of the nodes of G, let function M return M(P,i)=j if node i is in partition $G_j$ in P and let function L(P,i) return the total load on node i in partition P:

$$L(P, i) = \sum_{j \neq i, G_{M(P,j)} = G_{M(P,i)}} w((i, j)).$$

it is noted that, given partition P, functions M and L can be computed in polynomial time in the size of graph G. It is noted that a partition P=$G_1, G_2, \ldots G_S$ is considered to be locally optimal if there does not exist a node i and a partition index k≠M(P,i) such that moving node i from partition $G_{M(P,i)}$ to partition $G_k$ (a local exchange of node i) results in a strictly lower value for the load L(P,i). Let N(P) be a function that returns ∅ if P is locally optimal; otherwise, it returns {i,k}. Here, i is the first node i in G such that a local exchange of node i from partition $G_{M(P,i)}$ to partition $G_k$ results in a strictly lower value of $L_i$. It is noted that, given a partition P, the function N(P) can be computed efficiently in time polynomial in the size of graph G.

The local-greedy algorithm, as indicated above, is based on a node partitioning algorithm. It may be shown that the load L(P,i) for any node i is at most 1 in the partition P=$G_1, G_2, \ldots G_S$ returned by the local greedy algorithm. Lemma 2 states that, in P, L(P,i)≤1 for any node i in G. A proof of Lemma 2 follows. For partition index j≠M(P,i), let $W_j$ be the total weight of the edges that go between node i and any node k in partition $G_j$. Note that $W_j \geq L(P,i)$, because otherwise, by moving node i to partition $G_j$, the load on node i will strictly go down. This will violate the condition that P is locally optimal. Thus, L(P,i)≤$W_j$ ∀j≠M(P,i). Adding these inequalities for all the S−1 partitions j≠M(P,i) and adding an extra L(P,i) on both sides gives:

$$S \cdot L(P, i) \leq \sum_{j \neq M(P,i)} W_j + L(P, i).$$

However, the right side of this inequality is just the total weight of all edges incident on node i which is $$\sum_{j \neq i} w((i, j)) = \sum_{j \neq i} 1/[gcd(T(f_i), T(f_j))] \leq S.$$

Here, in the middle term, only those flows $f_j$ with which flow $f_i$ contends are included. As such, S·L(P,i)≤S or L(P,i)≤1.

The local-greedy algorithm, as discussed further below, will terminate after a finite number of iterations. Here, consider the total load of all nodes within all of the partitions:

$$L = \sum_i L_i = \sum_i \sum_{j \neq i, j \in G_{M(P,i)}} w((i, j)).$$

Let n be the node selected by the local-greedy algorithm in iteration i. Let $\Delta$ be the change (decrease) in the load of node n in iteration i. It is noted that $\Delta>0$. It may be seen that L must decrease by $\Delta$ in iteration i. As L cannot be negative and as its initial value is bounded, it cannot be reduced by $\Delta>0$ indefinitely. Hence, the local-greedy algorithm must find a locally optimal solution in finite time. The above argument shows that the local-greedy algorithm must terminate; however, the running time can be dependent on the edge weights and, thus, can be exponential in size of G. It may be shown that, by trading off a bit more switch capacity, the running time of the local-greedy algorithm may be made polynomial in size of G.

The local-greedy algorithm, as indicated above, may be made polynomial in size of G by trading off switch capacity. This may be done by starting with creation of S+1 partitions instead of S partitions. Let $\in<1$ be any given error tolerance. A new function N(P) is defined as $N(P)=N(\in,P)$. Let i be the first node in G such that a local exchange of node i from partition $G_{M(P,i)}$ to partition $G_k$ results in a decrease of at least $\in/S$ in the value of $L_i$. If such an i exists then $N(\in,P)$ returns $\{i,k\}$, otherwise it returns $\emptyset$. The equivalent lemma in this setting is now established as Lemma 3. Lemma 3 states that, in P, $L(P,i)\le 1$ for any node i in G. A proof of Lemma 3 follows. For partition index $j\ne M(P,i)$, let $W_j$ be the total weight of the edges that go between node i and any node k in partition $G_j$. As P is locally optimal, it follows that $W_j \ge L(P,i) - \in/S$. Thus, $L(P,i) \le W_j + \in/S$, $\forall j \ne M(P,i)$. Thus, by adding the inequalities and by adding an extra $L(P,i)$ on both sides gives: $(S+1)\cdot L(P,i) \le S + \in$ or $L(P,i) \le 1 - [(1-\in)/(S+1)]$. As $\in<1$, it gives $L(P,i) \le 1$. It is noted that, in each iteration of the algorithm, for some node i, the load $L_i$ decreases by $\in/S$. As such, the total load of all nodes L must decrease by $2\in/S$ in iteration i. Since the maximum value of each $L_i$ is S, the initial value of L satisfies $L \le nS$. It is further noted that $L \ge 0$. As such, if m denotes the number of iterations of the algorithm, then it gives $m_i(2\in/S) \le nS$. This gives $m_i \le nS^2/2\in$. Thus, the number of iterations of the local-greedy algorithm is upper bounded by $O(nS^2/\in)$. As S is a small constant, the running time of the local-greedy algorithm is polynomial in G and the error tolerance $1/\in$. In Lemma 3, it was established that the load on any node I in partition P is bounded by $L(P,i) \le 1 - [(1-\in)/(S+1)]$. Thus, it may be seen that there may be a tradeoff between running time of the local-greedy algorithm and spare switch capacity that may be reserved for future growth. In particular, it may be seen that a fraction $[(1-\in)/(S+1)]$ of the switch capacity stays unused within each partition $G_i$ after the flows are scheduled. The smaller $\in$ is the higher the spare capacity is, but it comes at a cost of a higher running time for the local-greedy algorithm.

It is noted that pseudocode representing the local-greedy algorithm discussed above is illustrated in FIG. 5 as local-greedy algorithm pseudocode 500.

In at least some example embodiments, one or more algorithms may be used to determine whether an assignment A is contention free. In at least some example embodiments, the randomized algorithm (e.g., randomized algorithm 200 of FIG. 2) may check if any of the assignments $A_1$, $A_2$, ..., $A_N$ is contention free. In at least some example embodiments, the greedy algorithm (e.g., greedy algorithm pseudocode 300 of FIG. 3) may check for contention free scheduling. It is noted that two algorithms for such contention free checking are discussed further below.

In at least some example embodiments, contention free checking may be performed using a "brute force" algorithm. The brute force algorithm for checking if assignment A is contention free is to look for potential contentions at every switch, in every time slot, in one period of the entire schedule for all flows $f_1, f_2, \ldots, f_n$. It is noted that the combined period of all these flows is of length $L=lcm(T(f_1), T(f_2), \ldots, T(f_n))$ slots, where lcm stands for least common multiple. This may be further understood by focusing on a given switch X. For computing contentions at X, start with an array Z of size L, initially set to all zeros. The algorithm then goes over the $f_1$, $f_2$, and so forth, one by one. The brute force algorithm, when going over flow $f_i$, adds a one ("1") to position p in array Z for every time slot p in which a packet is scheduled to arrive in flow $f_i$. It is noted that packet arrivals of $f_i$ can be computed on the basis of the start time $s(f_i)$ in A, the per period packet arrival schedule $S(f_i)$, and the period $T(f_i)$. After the array Z has been completed, the maximum value in array Z is computed. It is noted that assignment A is contention free at X if and only if this maximum value is at most one. In order to determine if assignment A is contention free, the process of completing the array Z has to be repeated at every switch X. It is noted that the algorithm runs in time $O(L\cdot n\cdot R)$, where R is the number of switches. It is noted that one potential drawback of the brute force algorithm is that, in general, L can be very large (in the worst case it can be exponential in n), which may make it infeasible to make even one pass over the entire array Z for even a single switch X. It is further noted that one approach to mitigate this issue can be to limit the size of X to a known upper bound l on the size of all flows $f_i$; however, this can only be done if the size of each flow is known in advance.

Figures 6, 7:
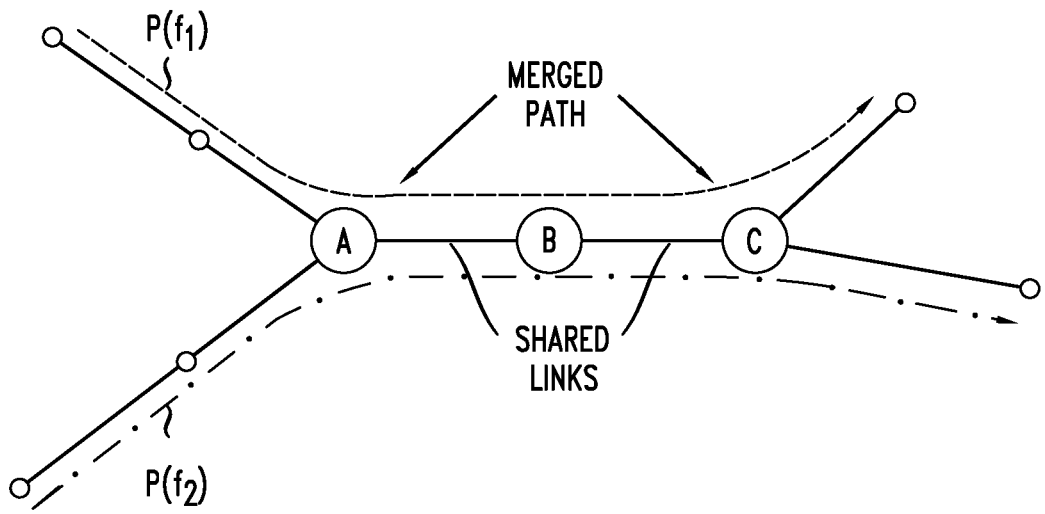
FIG. 6 depicts an example embodiment of pseudocode for an algorithm for checking if a set of flow start time assignments for a set of flows is contention free based on Bézout's identity.
FIG. 7 depicts an example of flow paths merging in a manner that may prevent a set of flow start time assignments for a set of flows from being contention free.

In at least some example embodiments, contention free checking may be performed using an algorithm that is based on Bézout's identity. This algorithm is more practical than the brute force algorithm for checking if assignment A is contention free when all flows are simple periodic flows, as this algorithm does not depend on knowing l in advance and does not require computing a big schedule of size L. In the following, it is assumed that the switch processing delays $p(r)$ are the same for all switches r and that all flows are simple periodic flows. Let $s_A(f)$ denote the start time assigned to flow f in flow start time assignment A. It is noted that flow start time assignment A is contention free if every pair of flows is contention free in flow start time assignment A. This may be further understood by considering a pair of flows $f_k$ and $f_l$. Lemma 5, which is discussed further below, states that, in the absence of any other flows, two flows $f_1$ and $f_2$ can only contend at no more than one switch and the switch where they contend is always the first switch on which their paths $P(f_1)$ and $P(f_2)$ merge (i.e., their common shared path). So, from Lemma 5, it is known that, for the pair of flows $f_k$ and $f_l$, it is only necessary to check for contention at the first switch X on their common shared path SP. In particular, a check is made to determine whether any packet of $f_k$ arrives at switch X simultaneously with a packet of $f_l$. Let the total packet propagation and processing delay on the links and switches on the path $P(f_k)$ ($P(f_l)$) up to switch X be denoted by $d(f_k)$ ($d(f_l)$). Thus, the (i+1)-th packet of flow $f_k$ contends with the (j+1)-th packet of flow $f_l$ at switch X if and only if $s_A(f_k)+d(f_k)+i\cdot T(f_k)=s_A(f_l)+d(f_l)+j\cdot T(f_l)$ (denoted as Equation (1)). Thus, flows $f_k$ and $f_l$ contend if there exist $i \ge 0$ and $j \ge 0$ that satisfy Equation (1). Let $D(k,l)=s_A(f_k)+d(f_k)-s_A(f_l)-d(f_l)$ be the delay differential of flow $f_k$ with respect to flow $f_l$ at the first switch X on their common shared path SP. Lemma 6, which is discussed further below, states that, for positive integers a, b, r, there exist nonnegative integers i, j such that $r+a\cdot i=b\cdot j$ if and only if $r \equiv 0 \bmod \gcd(a,b)$. From Lemma 6 it follows that Equation (1) holds if and only if $D(k,l) \equiv 0$ mod $\gcd(T(f_k), T(f_l))$ (denoted as Equation (2)). Thus, a fast algorithm to check if A is contention free is to check that Equation (2) does not hold for any flow pair $f_k$ and $f_l$. This is the approach taken in the algorithm that is based on Bézout's identity. It is noted that the running time of this algorithm is $O(n^2)$. This can be a significant improvement over the brute force algorithm in practice. It is noted that pseudocode representing the algorithm discussed above for checking if A is contention free based on Bézout's identity is illustrated in FIG. 6 as contention algorithm pseudocode 600. This algorithm may be further understood by considering the following example.

In this example, assume that there are n=10,000 flows, that there are R=50 switches, and that the flow periods range from 1 ms to 100 ms. In this situation, it may be assumed that the combined period of all flows $L=\text{lcm}(T(f_1), T(f_2), \ldots, T(f_n))$ to be 10 sec or more. Converting this into the number of slots gives us $L \geq 100{,}000{,}000$ (for time slot size $\tau=100$ ns). Thus, the brute force algorithm will need to carry out $n \cdot R \cdot L = 5 \cdot 10^{13}$, or 50 trillion, operations which makes it infeasible. On the other hand, the algorithm for checking if A is contention free based on Bézout's identity would only require 100 million operations, which makes it much more practical.

As discussed above, the algorithm discussed above for checking if A is contention free based on Bézout's identity is based on Lemma 4, Lemma 5, and Lemma 6, each of which is discussed further below.

First, it is noted that Lemma 4 states that, letting $e_1, e_2, \ldots$ be the set of common links on two paths $P(f_1)$ and $P(f_2)$ for two flows $f_1$ and $f_2$, then the set of links $e_1, e_2, \ldots$ form a connected path. A proof of Lemma 4 follows. Let r be a switch on link $e_1$. It is noted that both the shortest paths $P(f_1)$ and $P(f_2)$ include switch r. Let $B(P(f_1))$ and $E(P(f_1))$ be the first and last switches of path $P(f_1)$ and let $B(P(f_2))$ and $E(P(f_2))$ be the first and last switches of path $P(f_2)$. It will be appreciated that the shortest path between switch r and switch $B(P(f_1))$ is exactly the subpath between switch r and switch $B(P(f_1))$ of $P(f_1)$ and, likewise, the shortest path between switch r and switch $E(P(f_1))$ is exactly the subpath between switch r and switch $E(P(f_1))$ of $P(f_1)$. Additionally, the same holds true for the two subpaths of path $P(f_2)$ formed by switch pair r and $B(P(f_2))$ and switch pair r and $E(P(f_2))$. Consider the shortest path tree T rooted at switch r. It follows that all of the above-mentioned four subpaths of flow paths $P(f_1)$ and $P(f_2)$ are in T, and $P(f_1)$ is the unique path between switches $B(P(f_1))$ and $E(P(f_1))$ in T and $P(f_2)$ is the unique path between switches $B(P(f_2))$ and $E(P(f_2))$ in T. It is noted that the set of links common between any two paths of a tree must themselves form a single connected path. Thus, the result follows. A consequence of Lemma 4 is that flow paths can only "merge" once. This is illustrated in FIG. 7 as network 700. Here A, B, and C are switches and paths $P(f_1)$ and $P(f_2)$ share common links (A, B) and (B, C). Their merged region forms the connected path A, B, C. After diverging from switch C, the two paths cannot merge again at some other switch in the network.

As previously indicated, Lemma 5 states that it is known that, in the absence of any other flows, two flows $f_1$ and $f_2$ can only contend at no more than one switch and the switch where they contend is always the first switch on which their paths $P(f_1)$ and $P(f_2)$ merge (i.e., their common shared path). A proof of Lemma 5 follows. In order to prove Lemma 5, consider two periodic flows $f_1$ and $f_2$. It is noted that if the paths $P(f_1)$ and $P(f_2)$ of the two periodic flows $f_1$ and $f_2$ do not share a network link then the flows cannot collide. This is due to the fact that collision can only happen if two packets, one from each flow, arrive simultaneously at a switch, and then both these packets depart the switch on the same outgoing port (link) e. This means that the link e must be on both the paths $P(f_1)$ and $P(f_2)$. As shown in Lemma 4, links shared by paths $P(f_1)$ and $P(f_2)$ must themselves form a single connected path. For flows $f_1$ and $f_2$ to contend a packet $p_1$ of $f_1$ and a packet $p_2$ of $f_2$ must arrive simultaneously at one of the switches on their common shared path SP. In FIG. 7, SP=A, B, C. Let X be first switch on the path SP where this happens and therefore leads to a contention. This first switch is defined by the direction of flow of packets on the path. For contention to happen at switch X, both packets $p_1$ and $p_2$ must enter switch X at the same time and must leave switch X on the same link. It is to be shown that switch X must be the first switch on SP. If switch X is not the first switch on SP, then this implies that on SP there is another switch X' that is just before switch X on SP and on which there is no contention between flow packets $p_1$ of $f_1$ and $p_2$ of $f_2$. Let $e=(X', X)$ be the link between the two switches on SP. This means that packets $p_1$ and $p_2$ enter switch X' at different times and leave switch X' on link (X', X) and, thus, enter switch X at the same time. This cannot happen since processing time p(X') on switch X' is the same for both packets and also the propagation delay PD(e) on link e is also the same for both packets and there is no queuing delay at switch X' (because there was no contention at switch X'). As such, packets $p_1$ and $p_2$ must enter switch X' at the same time and there must be contention at switch X', which is a contradiction. Thus, it has been shown that the contention always happens at the first switch on SP. Thus, in FIG. 7, the contention happens at switch X=A. It is noted that, after this contention, the packets $p_1$ and $p_2$ do not contend again on any other switch on SP. This is because, after contention, one of these packets will always stay ahead of the other packet by one switch processing delay on SP.

As previously indicated, Lemma 6 states that, for positive integers a, b, and r, there exist nonnegative integers i and j such that $r+a \cdot i = b \cdot j$ if and only if $r \equiv 0$ mod $\gcd(a,b)$. A proof of Lemma 6 follows. Let $d=\gcd(a,b)$. Let there exist nonnegative integers i and j such that $r+a \cdot i = b \cdot j$ or $r=b \cdot j - a \cdot i$. Taking mod with respect to d on both side we see that the right side should be 0 as both a and b are divisible by d. Thus it follows that $r \equiv 0$ mod d. Now, let $r \equiv 0$ mod d. Thus $r=k \cdot d$ for some positive integer k. From Bézout's identity it follows there exist integers i' and j' such that $d=a \cdot i' + b \cdot j'$. Multiplying both sides by k and moving the first term on the right hand side to the left gives $r+a \cdot i'' = b \cdot j''$, where $i''=-k \cdot i'$ and $j''=k \cdot j'$. If $i'' \geq 0$, then it is done. However, if i'' is negative, then add $-a \cdot b \cdot i''$ to both sides of the equality. This gives $r+a \cdot -i'' \cdot (b-1) = b \cdot (j''-i'' \cdot a)$. It is noted that $-i'' \cdot (b-1) \geq 0$ and $j''-i'' \cdot a \geq 0$, as i'' is negative. Thus, setting $i=i'' \cdot (b-1)$ and $j=j''-i'' \cdot a$, the result follows.

It is noted that at least the randomized algorithm, the greedy algorithm, and the random-greedy algorithm easily extend to support incremental addition or deletion of flows. In the randomized algorithm, the assignment update only involves random selection of a slot for the new flow. The slot assignment for the new flow could be made more robust with selection of the best assignment among a series of trials. The greedy algorithm is naturally suited to support new flows as there the slot assignment is incrementally built.

It is noted that there are various conditions under which a feasible assignment solution exists and that there are conditions under which such feasible assignment solutions may be found using the algorithms presented herein. These conditions may be further understood by considering Lemma 7, Lemma 8, Lemma 9, and Lemma 10, each of which is described below.

Lemma 7 states that, for independent and identically distributed (i.i.d.) random start slot assignment for flows $f_1$, $f_2, \ldots, f_n$, the probability that a flow $f_i$ cannot be scheduled contention free is at most:

$$\sum_{j \neq i} 1/[gcd(T(f_i), T(f_j))].$$

A proof of Lemma 7 follows. As established in Equation (2) using Lemma 6, flow $f_i$ contends with a flow $f_j$ if and only if the delay differential between flow $f_i$ and flow $f_j$ at the contention switch satisfies $D(i,j) \equiv 0 \mod gcd(T(f_i), T(f_j))$. Let $d = gcd(T(f_i), T(f_j))$. It is noted that, for a fixed slot assignment for flow $f_j$ and a random slot assignment for flow $f_i$, the quantity $D(i,j) \mod d$ takes all possible values between $0 \ldots d-1$ with equal probability. Hence, the probability that $D(i,j) \equiv 0 \mod d$ is exactly $[1/gcd(T(f_i), T(f_j))]$. It is noted that, since slot assignments for flows is independent and identically distributed, this probability result holds for contention between flows $f_i$ and $f_j$. It is further noted that, summing over all flows $f_j$, $j \neq i$, gives the result following the union bound for probability.

Lemma 8 states that if, for all flows $f_i$, $$\sum_{j \neq i} 1/[gcd(T(f_i), T(f_j))] < 1,$$

then there exists a contention free slot assignment. Here, in the subscript, only those flows $f_i$ with which flow $f_j$ contends are included. A proof of Lemma 8 follows. It follows from Lemma 7 that, with an independent and identically distributed random start slot assignment, the probability that none of the flows has contention is:

$$\prod_{i=1}^{n}\left(1 - \sum_{j \neq i}[1/gcd(T(f_i), T(f_j))]\right) > 0.$$

Thus, the existence probability of a contention free slot assignment is strictly positive. Hence, there must exist at least one contention free slot assignment.

Lemma 9 states that the random-greedy algorithm always finds a contention free slot assignment if, for all flows $f_i$, the following holds:

$$\sum_{j < i} 1/[gcd(T(f_i), T(f_j))] < 1.$$

Here, in the subscript, only those flows $f_i$ with which flow $f_j$ contends are included. This is also equivalent to $$\sum_{j \leq i} 1/[gcd(T(f_i), T(f_j))] \leq 1.$$

Here, in the subscript, only those flows $f_i$ with which flow $f_j$ contends are included. A proof of Lemma 9 follows. It is noted that, in the greedy algorithm, the algorithm may ensure that flow $f_i$ does not contend with any flow $f_j$, $j < i$. Consider one such flow $f_j$. Let $d = gcd(T(f_i), T(f_j))$. It is noted that, in the round that the greedy algorithm considers flow $f_i$, the slot assignment for flow $f_j$ has already been fixed. Thus, as mentioned in the proof of Lemma 7, for a random slot assignment for flow $f_i$, the quantity $D(i,j) \mod d$ takes all possible values between $0 \ldots d-1$ with equal probability. Therefore, it follows from Equation (2) that, out of $T(f_i)$ possible slot assignments for flow $f_i$, only $T(f_i)/gcd(T(f_i), T(f_j))$ of them cause contention with flow $f_j$. Applying this result to all flows $f_j$, for which $j < i$, it may be seen that only $$\sum_{j<i} T(f_i)/[gcd(T(f_i), T(f_j))]$$

slot assignments for $f_i$ can cause contention with any of the flows for which $j < i$. Thus, as long as $$\sum_{j<i} T(f_i)/[gcd(T(f_i), T(f_j))] < T(f_i),$$

there is at least one slot assignment for flow $f_i$ that causes no contention with any of the flows $f_j$. This is because each term in the sum on the left side is an integer and, hence, the left side must be at least one less than the right side if the inequality holds. Dividing both side by $T(f_j)$, the result follows. It is noted that this is equivalent to: as $$\sum_{j \leq i} T(f_i)/[gcd(T(f_i), T(f_j))] \leq T(f_i).$$

Dividing both sides by $T(f_j)$ gives:

$$\sum_{j \leq i} 1/[gcd(T(f_i), T(f_j))] \leq 1.$$

Lemma 10 states that the random-greedy algorithm always finds a contention free slot assignment if, for all flows $f_i$, the following holds:

$$\sum_{j} 1/[gcd(T(f_i), T(f_j))] \leq 1.$$

Here, in the subscript, only those flows $f_i$ with which flow $f_j$ contends are included. A proof of Lemma 10 follows It follows from $$\sum_{j} 1/[gcd(T(f_i), T(f_j))] \leq 1 \text{ that } \sum_{j \leq i} 1/[gcd(T(f_i), T(f_j))] \leq 1.$$

Hence, the result follows from this. It will be appreciated that the efficiency of the algorithm may be further understood by considering the following example.

In order to further understand the efficiency of the algorithm, consider the following example. First, it is noted that, for τ=100 ns and for 1-100 ms period flows, all $T(f_i)$ are multiples of 10,000 (as $T(f_i)$ is the number of slots in one period of flow $f_i$). Hence, all the gcd values $gcd(T(f_i), T(f_j))$ are 10,000 or higher multiples of 10,000. This implies that, as long as the number of flows $f_j$ that a flow $f_i$ contends with is at most 10,000, the greedy algorithm will be able to find a contention free schedule. This also implies that at least 100,000 flows can be supported contention free in a network in which no flow contends with more than 10% other flows (e.g., with well distributed flow paths so most pairs of paths are link disjoint) and the greedy algorithm can find a contention free schedule for them. It is noted that these numbers can be quite loose as, in reality, many of the gcd values $gcd(T(f_i), T(f_j))$ may far exceed 10,000 and even a much smaller slot size τ may be supported. With that, in practice many more flows can be supported and scheduled contention free using the greedy algorithm. It is noted that, with random slot assignment, among 10,000 flows, the worst case queuing delay due to contention is typically observed to be no more than one time slot.

Figure 8:
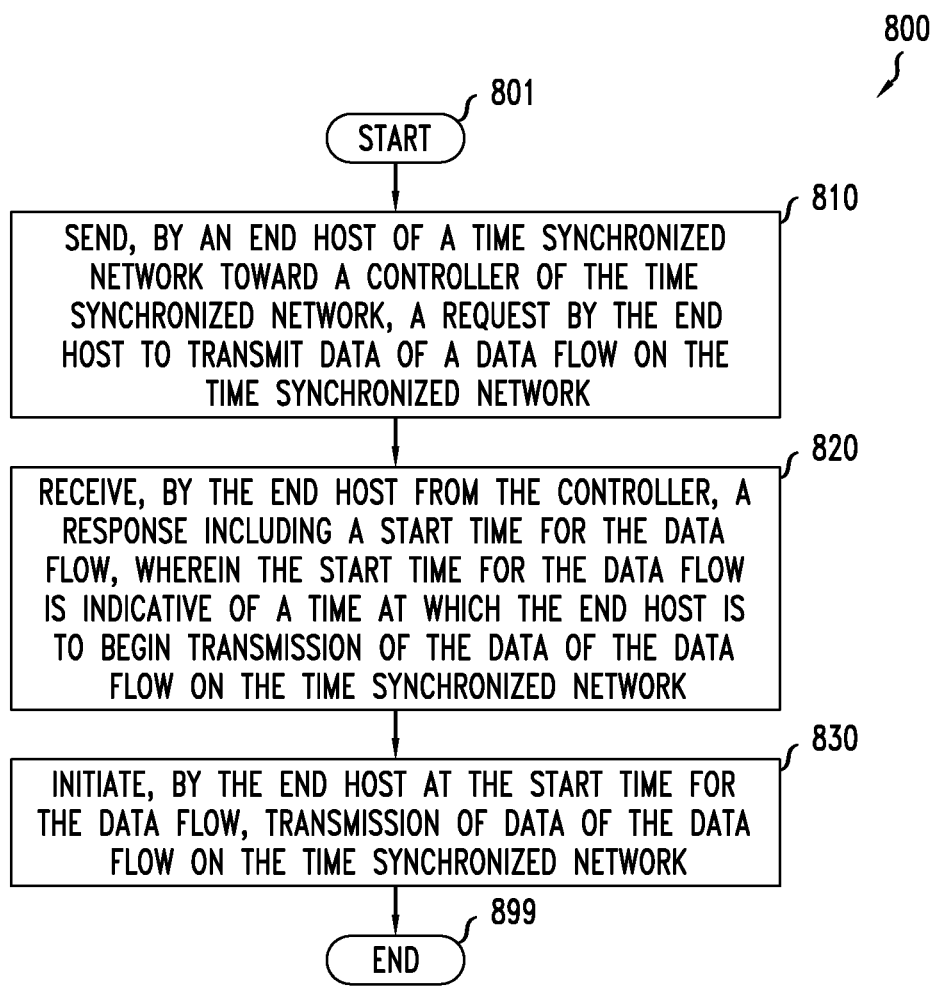
FIG. 8 depicts an example embodiment of a method for use by a controller to support deterministic flows in time synchronized networks.

FIG. 8 depicts an example embodiment of a method for use by a communication device to support deterministic flows in time synchronized networks. It will be appreciated that, although primarily presented as being performed serially, at least a portion of the functions of method 800 may be performed contemporaneously or in a different order than as presented with respect to FIG. 8. At block 801, method 800 begins. At block 810, send, by an end host of a time synchronized network toward a controller of the time synchronized network, a request by the end host to transmit data of a data flow on the time synchronized network. At block 820, receive, by the end host from the controller, a response including a start time for the data flow, wherein the start time for the data flow is indicative of a time at which the end host is to begin transmission of the data of the data flow on the time synchronized network. At block 830, initiate, by the end host at the start time for the data flow, transmission of data of the data flow on the time synchronized network. At block 899, method 800 ends. It will be appreciated that various functions presented herein with respect to FIGS. 1-7 may be incorporated within the context of method 800 of FIG. 8.

Figure 9:
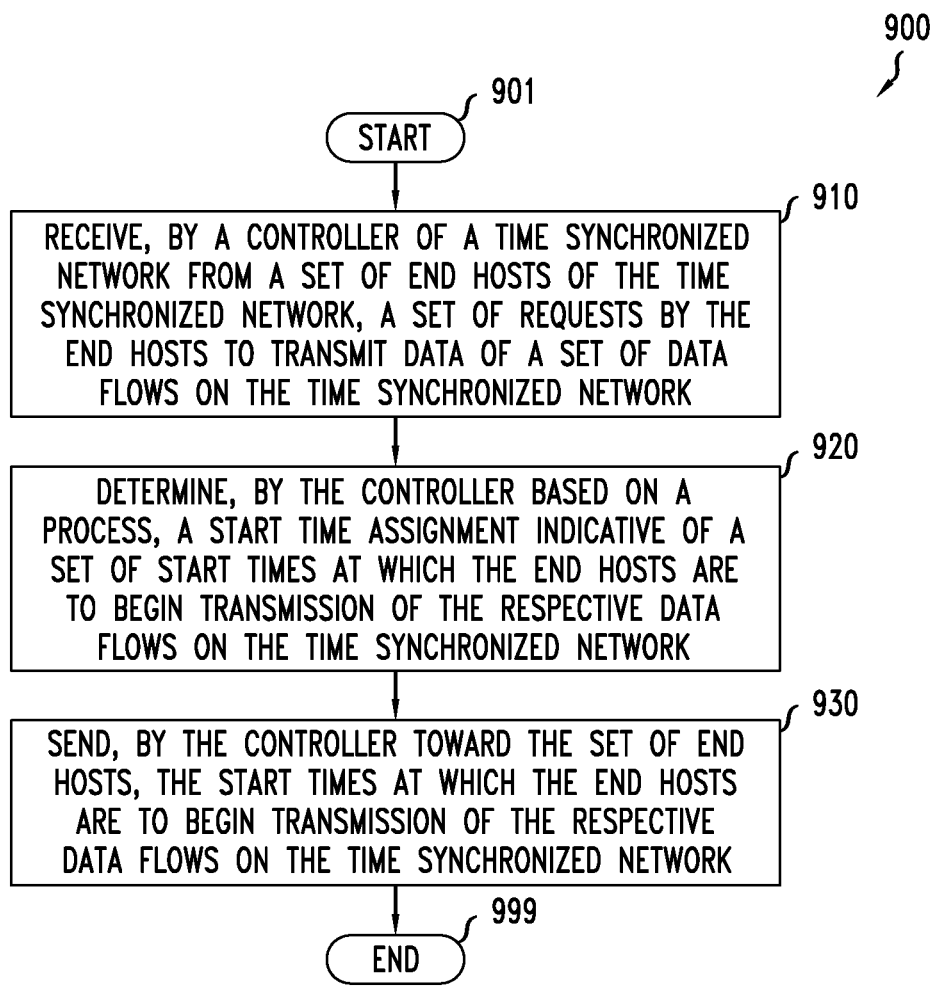
FIG. 9 depicts an example embodiment of a method for use by a controller to support deterministic flows in time synchronized networks.

FIG. 9 depicts an example embodiment of a method for use by a controller to support deterministic flows in time synchronized networks. It will be appreciated that, although primarily presented as being performed serially, at least a portion of the functions of method 700 may be performed contemporaneously or in a different order than as presented with respect to FIG. 9. At block 901, method 900 begins. At block 910, receive, by a controller of a time synchronized network from a set of end hosts of the time synchronized network, a set of requests by the end hosts to transmit data of a set of data flows on the time synchronized network. At block 920, determine, by the controller based on a process, a start time assignment indicative of a set of start times at which the end hosts are to begin transmission of the respective data flows on the time synchronized network. In at least some example embodiments, for at least one of the start times at which the end hosts are to begin transmission of the respective data flows on the time synchronized network, the start time includes a respective time slot selected from a set of available time slots associated with a time interval for the respective data flow. In at least some example embodiments, determining the start time assignment includes determining, by the controller, a set of potential start time assignments, wherein each of the potential start time assignments includes a respective set of start times at which the end hosts are to begin transmission of the respective data flows on the time synchronized network and selecting, by the controller, one of the potential start time assignments as the start time assignment indicative of the set of start times at which the end hosts are to begin transmission of the respective data flows on the time synchronized network. In at least some example embodiments, for at least one of the potential start time assignments, the respective potential start time assignment is determined based on random selection from a set of available time slots associated with a time interval for the respective data flow. In at least some example embodiments, the one of the potential start time assignments selected as the start time assignment is one of the potential start time assignments for which a worst case queuing delay is lowest. In at least some example embodiments, determining the start time assignment includes determining, for one of the data flows from a set of available time slots, a set of candidate time slots including ones of the available time slots which are not assigned to any of the data flows in the set of flows and for which the one of the data flows would not collide with any of the data flows in the set of data flows if the one of the data flows is assigned to that available time slot. In at least some example embodiments, based on a determination that the set of candidate time slots is not empty, the respective start time for the one of the data flows is determined based on a random selection of one of the candidate time slots for the one of the data flows. In at least some example embodiments, the one of the data flows is handled based on a determination that the set of candidate time slots is empty, where the handling includes assigning one of the available time slots to the one of the data flows or preventing transmission of the one of the data flows. In at least some example embodiments, determining the start time assignment includes partitioning, by the controller, the data flows in the set of data flows into a set of data flow groups including respective subsets of the data flows in the set of data flows, determining, by the controller, a set of partial start time assignments for the respective data flow groups, wherein, for each of the respective data flow groups, the respective partial start time assignment for the respective data flow group is indicative of a set of start times for the respective data flows in the subset of data flows of the respective data flow group; and determining, by the controller based on a combination of the partial start time assignments, the start time assignment indicative of the set of start times at which the end hosts are to begin transmission of the respective data flows on the time synchronized network. In at least some example embodiments, the data flows are partitioned into the set of data flow groups randomly. In at least some example embodiments, the data flows are partitioned into the set of data flows based on a local search based partitioning. In at least some example embodiments, the local search based partitioning is based on a condition configured to measure whether moving one of the data flows from one of the data flow groups to another of the data flow groups results in a lower load in the one of the data flow groups. In at least some example embodiments, for at least one of the data flow groups, determining the partial start time assignment for the respective data flow group includes determining, for one of the data flows of the respective data flow group from a set of available time slots associated with the respective data flow group, a set of candidate time slots including ones of the available time slots associated with the respective data flow group which are not assigned to any of the data flows in the respective data flow group and for which the one of the data flows would not collide with any of the data flows in the respective data flow group if the one of the data flows is assigned to that available time slot associated with the respective data flow group. In at least some example embodiments, the set of available time slots associated with the respective data flow group includes a subset of a set of available time slots associated with the start time assignment and divided among the data flow groups. In at least some example embodiments, the set of available time slots associated with the respective data flow group includes a number of time slots that is, at most, a number of time slots in a set of available time slots associated with the start time assignment. In at least some example embodiments, a determination is made as to whether the start time assignment is contention free. In at least some example embodiments, determining whether the start time assignment is contention free includes determining, by the controller for each of a plurality of switches of the time synchronized network, whether there is a potential contention at the switch for any of the data flows in any of a plurality of time slots of a time interval with which the start time assignment is associated. In at least some example embodiments, determining whether the start time assignment is contention free includes determining, by the controller for each pair of the data flows in the set of data flows, whether, at a first switch on a common shared path of a first data flow in respective pair of data flows and a second data flow in the respective pair of data flows, any packet of the first data flow in the respective pair of data flows arrives at the same time as any packet of the second data flow in the respective pair of data flows. At block 930, send, by the controller toward the set of end hosts, the start times at which the end hosts are to begin transmission of the respective data flows on the time synchronized network. At block 999, method 900 ends. It will be appreciated that various packet communication support functions presented herein with respect to FIGS. 1-7 may be incorporated within the context of method 900 of FIG. 9.

Various example embodiments for supporting scheduling of deterministic flows in time synchronized networks may provide various advantages or potential advantages. For example, various example embodiments for supporting scheduling of deterministic flows in time synchronized networks may obviate the need for use of specialized technologies (e.g., field buses, specialized Ethernet protocols such as Profinet, or the like) to support handling of deterministic flows in time synchronized networks. For example, various example embodiments for supporting scheduling of deterministic flows in time synchronized networks may enable calculation of optimized transmission schedules for end hosts in time sensitive networks (e.g., networks based on IEEE time sensitive network standards such as IEEE 802.1Qbv and the like). For example, various example embodiments for supporting scheduling of deterministic flows in time synchronized networks may enable calculation of optimized transmission schedules for end hosts in time sensitive networks without relying on integer linear programming (ILP) which may be impractical in the case of more than a few hundred flows. For example, various example embodiments for supporting scheduling of deterministic flows in time synchronized networks may enable calculation of optimized transmission schedules for end hosts in time sensitive networks while maintaining an upper bound on how much the start time (T(f)) of a given flow may be delayed and obviating the need to rely arbitrary delaying of flows. For example, various example embodiments for supporting scheduling of deterministic flows in time synchronized networks may provide efficient algorithms and tight feasibility conditions for finding when two or more flows contend, which can be non-trivial for flows with time periods of different length. Various example embodiments supporting scheduling of deterministic flows in time synchronized networks may provide various other advantages or potential advantages.

Figure 10:
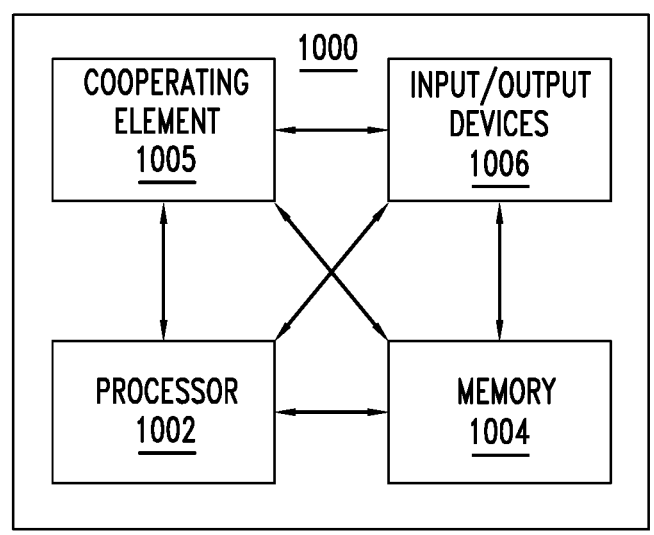
FIG. 10 depicts an example embodiment of a computer suitable for use in performing various functions presented herein.

FIG. 10 depicts an example embodiment of a computer suitable for use in performing various functions presented herein.

The computer 1000 includes a processor 1002 (e.g., a central processing unit (CPU), a processor, a processor having a set of processor cores, a processor core of a processor, or the like) and a memory 1004 (e.g., a random access memory, a read only memory, or the like). The processor 1002 and the memory 1004 may be communicatively connected. In at least some example embodiments, the computer 1000 may include at least one processor and at least one memory including a set of instructions, wherein the set of instructions is configured to, when executed by the at least one processor, cause the computer to perform various functions presented herein.

The computer 1000 also may include a cooperating element 1005. The cooperating element 1005 may be a hardware device. The cooperating element 1005 may be a process that can be loaded into the memory 1004 and executed by the processor 1002 to implement various functions presented herein (in which case, for example, the cooperating element 1005 (including associated data structures) can be stored on a non-transitory computer-readable storage medium, such as a storage device or other suitable type of storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1000 may represent a general architecture and functionality suitable for implementing functional elements described herein, portions of functional elements described herein, or the like, as well as various combinations thereof. For example, computer 1000 may provide a general architecture and functionality that is suitable for implementing one or more elements presented herein, such as a network devices (e.g., switches, routers, or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including a set of instructions;
   wherein the set of instructions is configured to, when executed by the at least one processor, cause the apparatus to:
     receive, by a controller of a time synchronized network from a set of end hosts of the time synchronized network, a set of requests by the end hosts to transmit data of a set of data flows on the time synchronized network;
     determine, by the controller based on a process, a start time assignment indicative of a set of start times at which the end hosts are to begin transmission of the respective data flows on the time synchronized network; and
     send, by the controller toward the set of end hosts, the start times at which the end hosts are to begin transmission of the respective data flows on the time synchronized network.

2. The apparatus of claim 1, wherein, for at least one of the start times at which the end hosts are to begin transmission of the respective data flows on the time synchronized network, the start time includes a respective time slot selected from a set of available time slots associated with a time interval for the respective data flow.

3. The apparatus of claim 1, wherein, to determine the start time assignment, the set of instructions is configured to, when executed by the at least one processor, cause the apparatus to:
   determine, by the controller, a set of potential start time assignments, wherein each of the potential start time assignments includes a respective set of start times at which the end hosts are to begin transmission of the respective data flows on the time synchronized network; and
   select, by the controller, one of the potential start time assignments as the start time assignment indicative of the set of start times at which the end hosts are to begin transmission of the respective data flows on the time synchronized network.

4. The apparatus of claim 3, wherein, for at least one of the potential start time assignments, the respective potential start time assignment is determined based on random selection from a set of available time slots associated with a time interval for the respective data flow.

5. The apparatus of claim 3, wherein the one of the potential start time assignments selected as the start time assignment is one of the potential start time assignments for which a worst case queuing delay is lowest.

6. The apparatus of claim 1, wherein, to determine the start time assignment, the set of instructions is configured to, when executed by the at least one processor, cause the apparatus to:
   determine, for one of the data flows from a set of available time slots, a set of candidate time slots including ones of the available time slots which are not assigned to any of the data flows in the set of flows and for which the one of the data flows would not collide with any of the data flows in the set of data flows if the one of the data flows is assigned to that available time slot.

7. The apparatus of claim 6, wherein the set of instructions is configured to, when executed by the at least one processor, cause the apparatus to:
   determine, based on a determination that the set of candidate time slots is not empty, the respective start time for the one of the data flows based on a random selection of one of the candidate time slots for the one of the data flows.

8. The apparatus of claim 6, wherein the set of instructions is configured to, when executed by the at least one processor, cause the apparatus to:
   handle, based on a determination that the set of candidate time slots is empty, the one of the data flows including assigning one of the available time slots to the one of the data flows or preventing transmission of the one of the data flows.

9. The apparatus of claim 1, wherein, to determine the start time assignment, the set of instructions is configured to, when executed by the at least one processor, cause the apparatus to:
   partition, by the controller, the data flows in the set of data flows into a set of data flow groups including respective subsets of the data flows in the set of data flows;
   determine, by the controller, a set of partial start time assignments for the respective data flow groups, wherein, for each of the respective data flow groups, the respective partial start time assignment for the respective data flow group is indicative of a set of start times for the respective data flows in the subset of data flows of the respective data flow group; and
   determine, by the controller based on a combination of the partial start time assignments, the start time assignment indicative of the set of start times at which the end hosts are to begin transmission of the respective data flows on the time synchronized network.

10. The apparatus of claim 9, wherein the data flows are partitioned into the set of data flow groups randomly.

11. The apparatus of claim 9, wherein the data flows are partitioned into the set of data flows based on a local search based partitioning.

12. The apparatus of claim 11, wherein the local search based partitioning is based on a condition configured to measure whether moving one of the data flows from one of the data flow groups to another of the data flow groups results in a lower load in the one of the data flow groups.

13. The apparatus of claim 9, wherein, for at least one of the data flow groups, to determine the partial start time assignment for the respective data flow group, the set of instructions is configured to, when executed by the at least one processor, cause the apparatus to:
   determine, for one of the data flows of the respective data flow group from a set of available time slots associated with the respective data flow group, a set of candidate time slots including ones of the available time slots associated with the respective data flow group which are not assigned to any of the data flows in the respective data flow group and for which the one of the data flows would not collide with any of the data flows in the respective data flow group if the one of the data flows is assigned to that available time slot associated with the respective data flow group.

14. The apparatus of claim 13, wherein the set of available time slots associated with the respective data flow group includes a subset of a set of available time slots associated with the start time assignment and divided among the data flow groups.

15. The apparatus of claim 13, wherein the set of available time slots associated with the respective data flow group includes a number of time slots that is, at most, a number of time slots in a set of available time slots associated with the start time assignment.

16. The apparatus of claim 1, wherein the set of instructions is configured to, when executed by the at least one processor, cause the apparatus to:
determine, by the controller, whether the start time assignment is contention free.

17. The apparatus of claim 16, wherein, to determine whether the start time assignment is contention free, the set of instructions is configured to, when executed by the at least one processor, cause the apparatus to:
determine, by the controller for each of a plurality of switches of the time synchronized network, whether there is a potential contention at the switch for any of the data flows in any of a plurality of time slots of a time interval with which the start time assignment is associated.

18. The apparatus of claim 16, wherein, to determine whether the start time assignment is contention free, the set of instructions is configured to, when executed by the at least one processor, cause the apparatus to:
determine, by the controller for each pair of the data flows in the set of data flows, whether, at a first switch on a common shared path of a first data flow in respective pair of data flows and a second data flow in the respective pair of data flows, any packet of the first data flow in the respective pair of data flows arrives at the same time as any packet of the second data flow in the respective pair of data flows.

19. A method, comprising:
receiving, by a controller of a time synchronized network from a set of end hosts of the time synchronized network, a set of requests by the end hosts to transmit data of a set of data flows on the time synchronized network;
determining, by the controller based on a process, a start time assignment indicative of a set of start times at which the end hosts are to begin transmission of the respective data flows on the time synchronized network; and
sending, by the controller toward the set of end hosts, the start times at which the end hosts are to begin transmission of the respective data flows on the time synchronized network.

20. An apparatus, comprising:
at least one processor; and
at least one memory including a set of instructions;
wherein the set of instructions is configured to, when executed by the at least one processor, cause the apparatus to:
send, by an end host of a time synchronized network toward a controller of the time synchronized network, a request by the end host to transmit data of a data flow on the time synchronized network;
receive, by the end host from the controller, a response including a start time for the data flow, wherein the start time for the data flow is indicative of a time at which the end host is to begin transmission of the data of the data flow on the time synchronized network; and
initiate, by the end host at the start time for the data flow, transmission of data of the data flow on the time synchronized network.

* * * * *